United States Patent
Zimmer

(10) Patent No.: US 9,619,862 B2
(45) Date of Patent: Apr. 11, 2017

(54) RAW CAMERA NOISE REDUCTION USING ALIGNMENT MAPPING

(71) Applicant: Apple Inc., Cupertino, CA (US)

(72) Inventor: Mark Zimmer, Aptos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/726,386

(22) Filed: May 29, 2015

(65) Prior Publication Data

US 2015/0350576 A1 Dec. 3, 2015

Related U.S. Application Data

(60) Provisional application No. 62/005,888, filed on May 30, 2014.

(51) Int. Cl.
| | |
|---|---|
| *G06T 3/40* | (2006.01) |
| *G06T 5/00* | (2006.01) |
| *G06K 9/40* | (2006.01) |
| *G06K 9/46* | (2006.01) |
| *G09G 5/02* | (2006.01) |
| *G09G 5/28* | (2006.01) |
| *H04N 5/21* | (2006.01) |

(52) U.S. Cl.
CPC ............ *G06T 3/4015* (2013.01); *G06T 5/002* (2013.01); *H04N 5/21* (2013.01); *G06T 2207/10024* (2013.01); *G06T 2207/20016* (2013.01); *G06T 2207/20021* (2013.01)

(58) Field of Classification Search
CPC combination set(s) only.
See application file for complete search history.

(56) References Cited

U.S. PATENT DOCUMENTS

| | | | |
|---|---|---|---|
| 7,762,814 B2 | 7/2010 | vanderZel | |
| 7,835,569 B2 | 11/2010 | Marcu | |
| 7,893,975 B2 | 2/2011 | Zimmer | |
| 7,965,411 B2 | 6/2011 | Suzuki | |
| 2005/0135700 A1* | 6/2005 | Anderson | G06T 5/002 |
| | | | 382/261 |
| 2010/0135588 A1 | 6/2010 | Au | |
| 2010/0272340 A1* | 10/2010 | Bar-Aviv | G06T 5/20 |
| | | | 382/131 |

(Continued)

*Primary Examiner* — Wesner Sajous
(74) *Attorney, Agent, or Firm* — Blank Rome LLP

(57) ABSTRACT

This disclosure pertains to novel devices, methods, and computer readable media for performing raw camera noise reduction using a novel, so-called "alignment mapping" technique to more effectively separate structure from noise in an image, in order to aid in the denoising process. Alignment mapping allows for the extraction of more structure from the image and also the ability to understand the image structure, yielding information for edge direction, edge length, and corner locations within the image. This information can be used to smooth long edges properly and to prevent tight image details, e.g., text, from being overly smoothed. In alignment maps, the amount of noise may be used to compute thresholds and scaling parameters used in the preparation of the alignment map. According to some embodiments, a feature map may also be created for the image. Finally, the image may be smoothed using the created feature map as a mask.

20 Claims, 27 Drawing Sheets

(20 of 27 Drawing Sheet(s) Filed in Color)

(56) References Cited

U.S. PATENT DOCUMENTS

| | | |
|---|---|---|
| 2011/0205227 A1* | 8/2011 | Fischer .................... G06T 5/50 |
| | | 345/419 |
| 2012/0051730 A1 | 3/2012 | Cote |
| 2012/0082380 A1 | 4/2012 | Fujiwara |
| 2014/0193069 A1 | 7/2014 | Kim |
| 2014/0267839 A1* | 9/2014 | Nishimaki ............ H04N 5/367 |
| | | 348/246 |

* cited by examiner

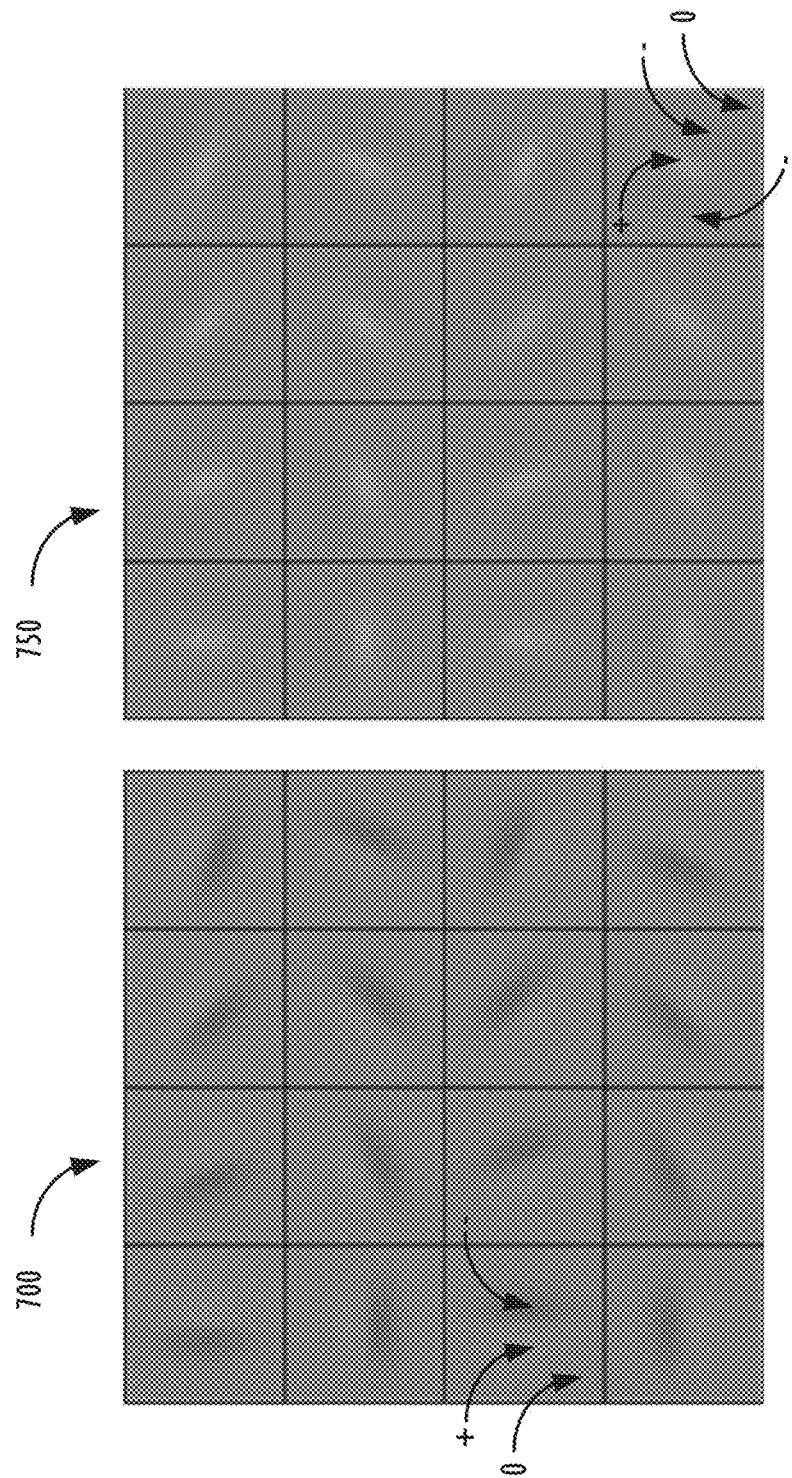

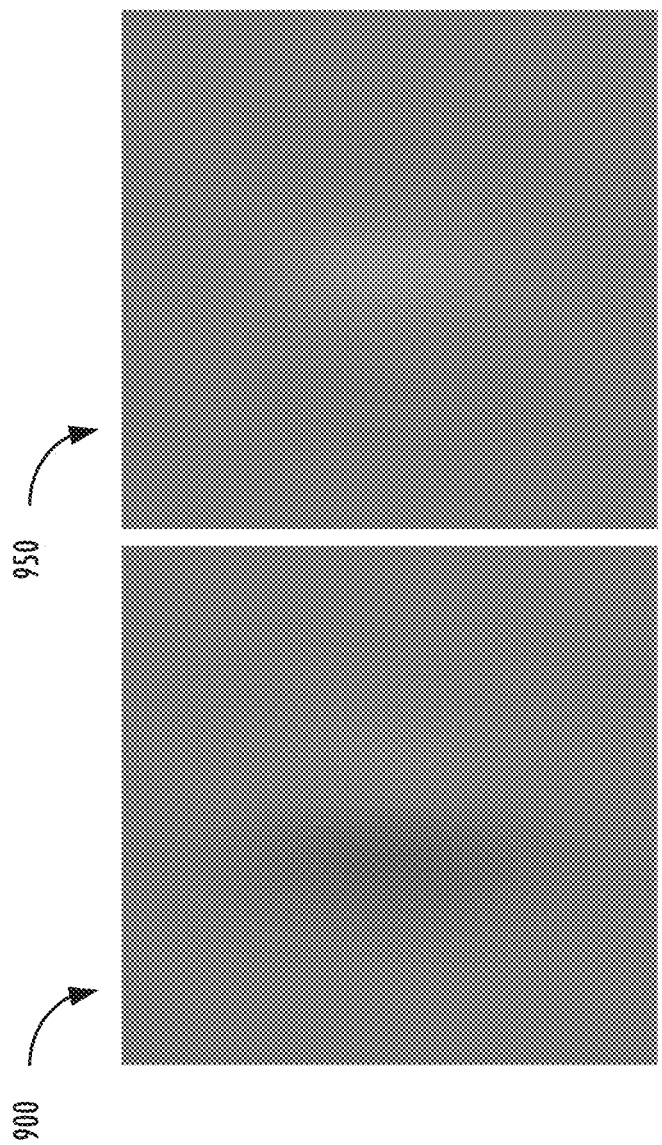

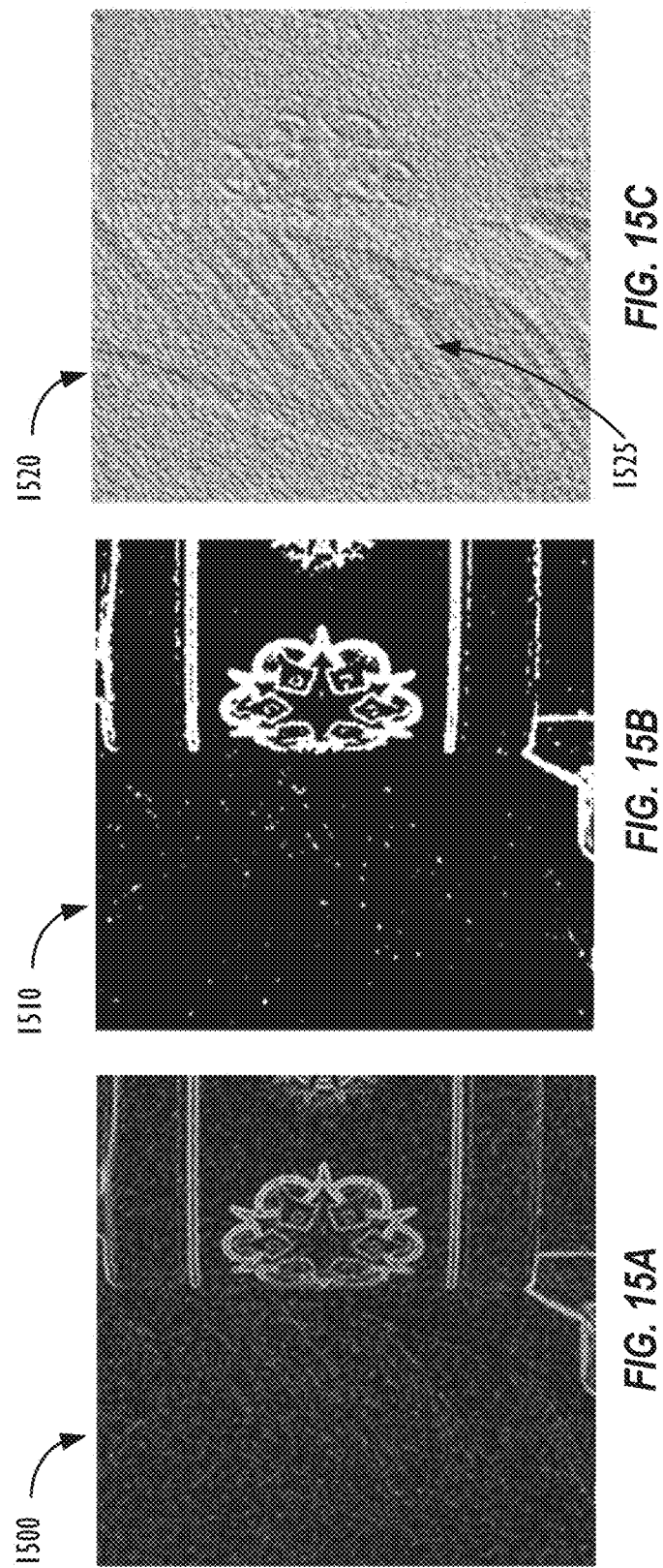

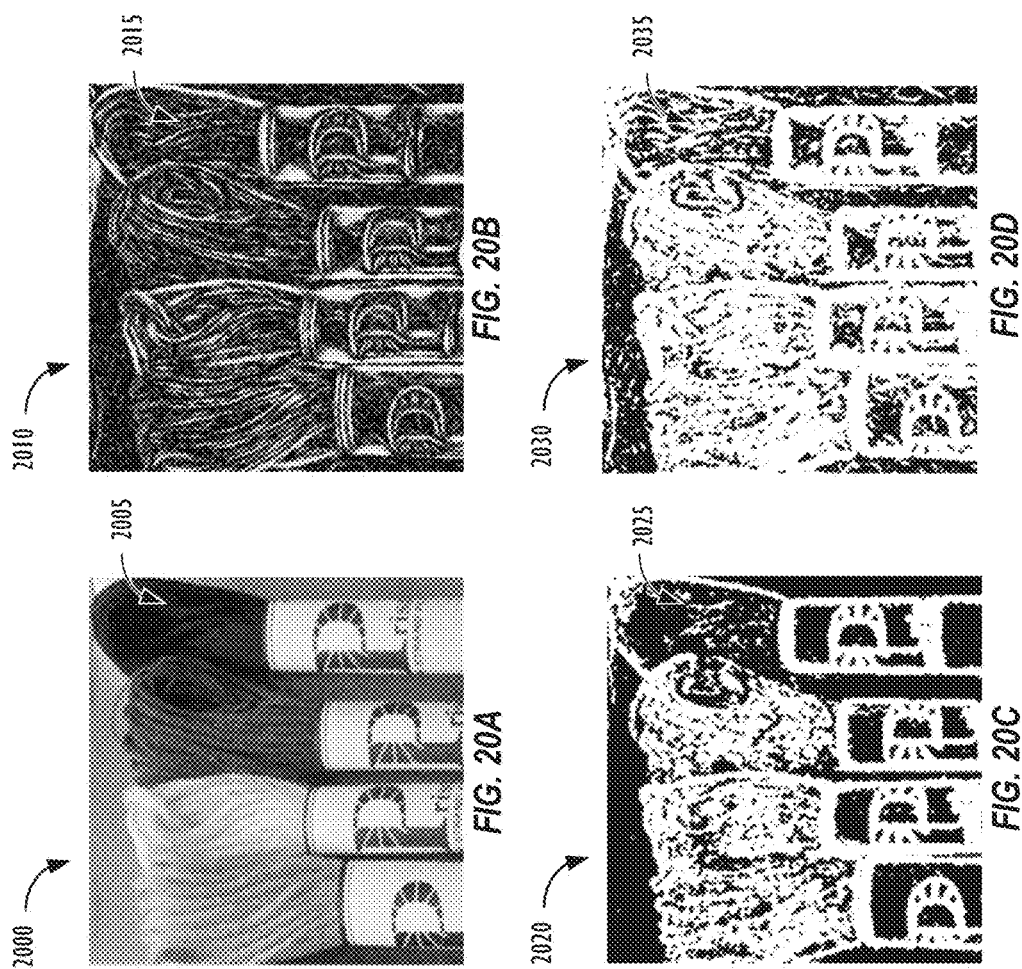

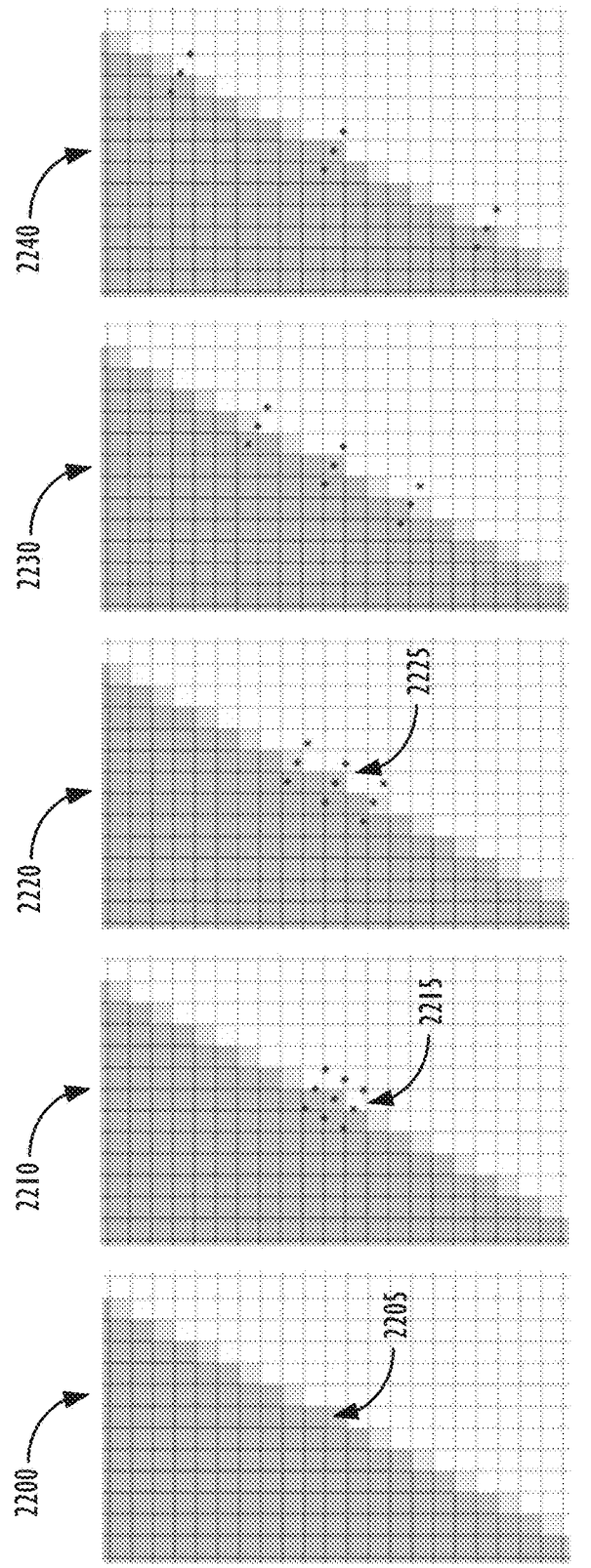

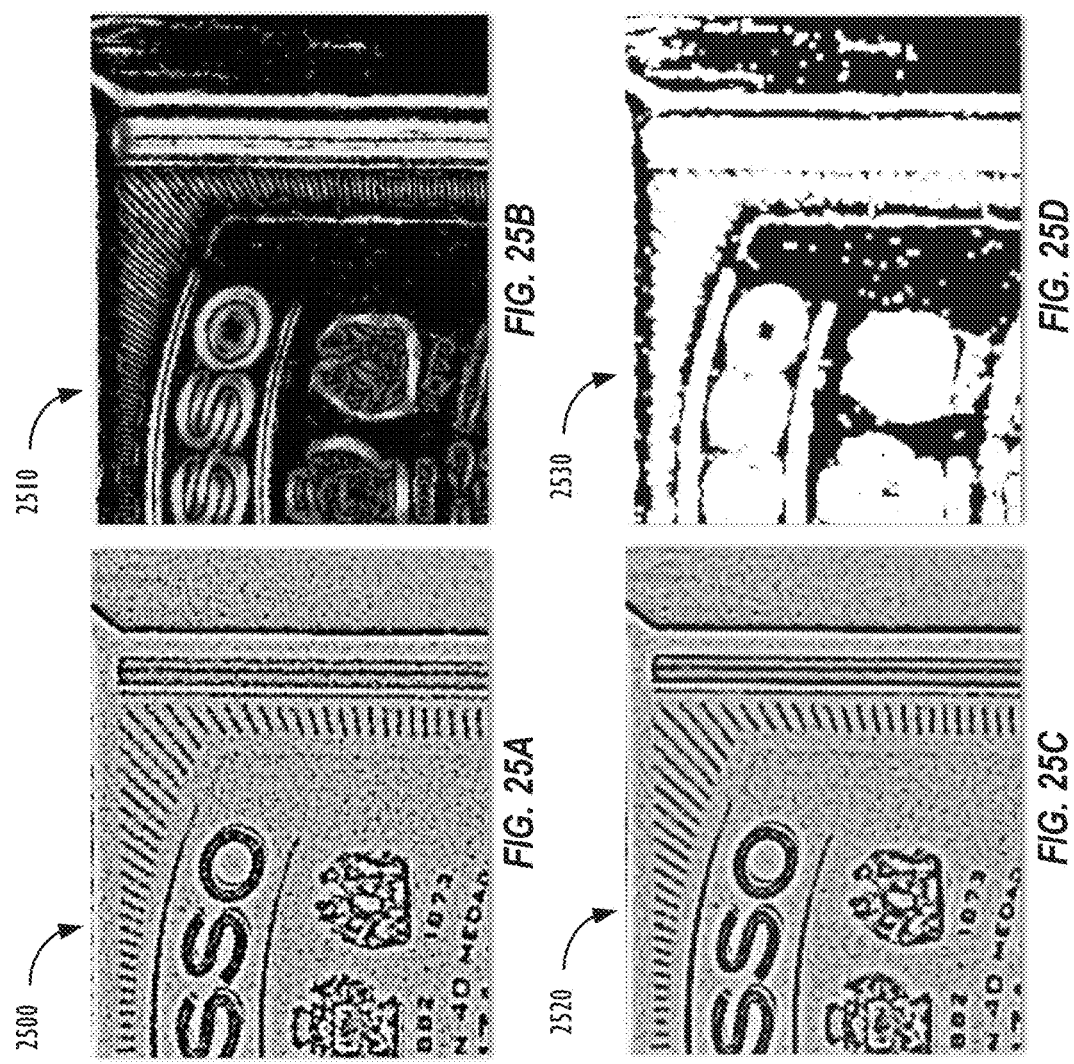

RAW CAMERA NOISE REDUCTION USING ALIGNMENT MAPPING

CROSS-REFERENCE TO RELATED APPLICATION

This application claims priority to provisional U.S. Patent Application Ser. No. 62/005,888, filed May 30, 2014 ("the '888 application"). The '888 application is hereby incorporated by reference in its entirety.

BACKGROUND

This disclosure relates generally to image processing techniques. More particularly, but not by way of limitation, it relates to novel techniques for performing raw camera noise reduction.

In photography, different artifacts, e.g., "noise," can affect the quality of the image. The defining problem of noise reduction is how much structure can be extracted from a noisy image. At the image sensor, noise can be considered to be white (i.e., no frequency dependence) with a signal dependent variance due to shot noise. Noise is largely un-correlated between color channels (R, G, B). At the end of a typical image processing pipeline (e.g., after undergoing noise reduction, demosaicing, white balancing, filtering, color enhancement, and compression in the image signal processor), image noise may be dependent on signal, frequency, illuminant, and light level, and also may be correlated between channels.

The noise reduction in a typical mobile phone camera pipeline is fairly basic. Noise reduction is constrained by the number of delay lines available for the image signal processor, as well as computational limitations. Second, since it typically takes a few years to design, test, and produce an image signal processor, the noise reduction algorithm in use in an actual product is typically a few generations old. The camera pipeline itself may introduce a number of artifacts such as false edges, sprinkles, and black/white pixel clumps that, from a signal point-of-view, do not appear to be noise, but actually appear more like structure. These artifacts can severely degrade image quality in bright light, especially in the sky regions (aka blue-sky noise), but they are especially severe in low-light. One way to mitigate noise, as well as artifacts, is to increase exposure time so that more photons can be accumulated in the image sensor, but this introduces motion blur.

Other traditional approaches to noise reduction involve edge detection and coring. For instance, a Sobel filter may be used to produce edge gradient magnitudes. Using coring, magnitudes below a certain threshold indicate noisy areas of the image and magnitudes above the threshold indicate image structure.

However, these prior art techniques fail to extract and understand image structure in the most optimal way, e.g., often failing to smooth long edges in images properly and/or overly smoothing tight image details, such as text. Hence, what is needed is an improved raw camera noise reduction method that excels at effectively separating meaningful structure from unwanted noise in an image using a novel "alignment mapping" process.

SUMMARY

In one embodiment, a method to perform a so-called "alignment mapping" image noise reduction process is employed for separating structure from noise in an image. This technique, referred to herein as alignment mapping, allows for the extraction of more structure from the image and also the ability to understand the image structure, yielding information for edge direction, edge length, and where the corners are. This information can be used to smooth long edges properly and also to prevent tight image detail like text from being overly smoothed. Image 100 of FIG. 1A is an exemplary image for which a "feature map" (image 110 of FIG. 1B) and a "direction vector field" (image 120 of FIG. 1C) have been calculated. The concepts of "feature maps" and "direction vector fields" will be described in further detail below.

In order to be maximally effective, a proper noise model is required for the image. This is because the amount of noise in an image typically varies as the square root of the intensity level. For instance, in coring, the coring threshold is adaptive to the average gray level of the image at the location. In alignment maps, the amount of noise is used to compute thresholds and scaling parameters used in the preparation of the alignment map and the feature map.

Thus, according to some embodiments, the improved noise reduction process first decomposes the image into a Laplacian pyramid, then smooths each level as it reconstructs the pyramid on the way up. According to some embodiments, this process only applies to the image luminance. [The image chrominance may be smoothed using a multi-level power blur technique, which is not discussed in further detail herein.] Next, the process performs an alignment mapping, the various steps of which will be described in greater detail below. Next, a feature map may be created for the image. Finally, the image may be smoothed using the created feature map as a mask.

The method may be embodied in program code and stored on a non-transitory storage medium. The stored program code may be executed by a processor that is part of, or controls, a device having a memory, a display, and a processor coupled to the memory, and the display.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 7A is an example of an imaginary part of a Gabor filter jet.

FIG. 7B is an example of a real part of a Gabor filter jet.

FIG. 9A is an example of a close-up of an imaginary part of a Gabor filter jet.

FIG. 9B is an example of a close-up of a real part of a Gabor filter jet.

FIG. 15A is an exemplary image for which a feature map and edge direction vector field may be determined.

FIG. 15B is an example feature map for the image of FIG. 15A.

FIG. 15C is an example edge direction vector field for the image of FIG. 15A.

FIG. 20A is an exemplary image for which an alignment map may be determined.

FIG. 20B is an exemplary alignment map for the exemplary image of FIG. 20A.

FIG. 20C is an exemplary feature map for the exemplary image of FIG. 20A.

FIG. 20D is an exemplary improved feature map for the exemplary image of FIG. 20A.

FIGS. 22A-22E illustrate a multi-pass, scaled image smoothing technique for an edge occurring in an image.

FIG. 25A is an exemplary unsmoothed image.

FIG. 25B is an exemplary alignment heat map for the exemplary image of FIG. 25A.

FIG. 25C is an exemplary smoothed image for the exemplary image of FIG. 25A.

FIG. 25D is an exemplary feature map for the exemplary image of FIG. 25A.

DETAILED DESCRIPTION

This disclosure pertains to systems, methods, and computer readable media for image processing. In general, techniques are disclosed for performing improved noise reduction on raw image data using a technique referred to herein as "alignment mapping."

In the following description, for purposes of explanation, numerous specific details are set forth in order to provide a thorough understanding of the inventive concept. As part of this description, some of this disclosure's drawings represent structures and devices in block diagram form in order to avoid obscuring the invention. In the interest of clarity, not all features of an actual implementation are described in this specification. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system- and business-related constraints), and that these goals will vary from one implementation to another. It will also be appreciated that such development efforts might be complex and time-consuming, but would nevertheless be a routine undertaking for those of ordinary skill in the art of electronic device operations having the benefit of this disclosure.

Laplacian Pyramid Decomposition

Figure 1:
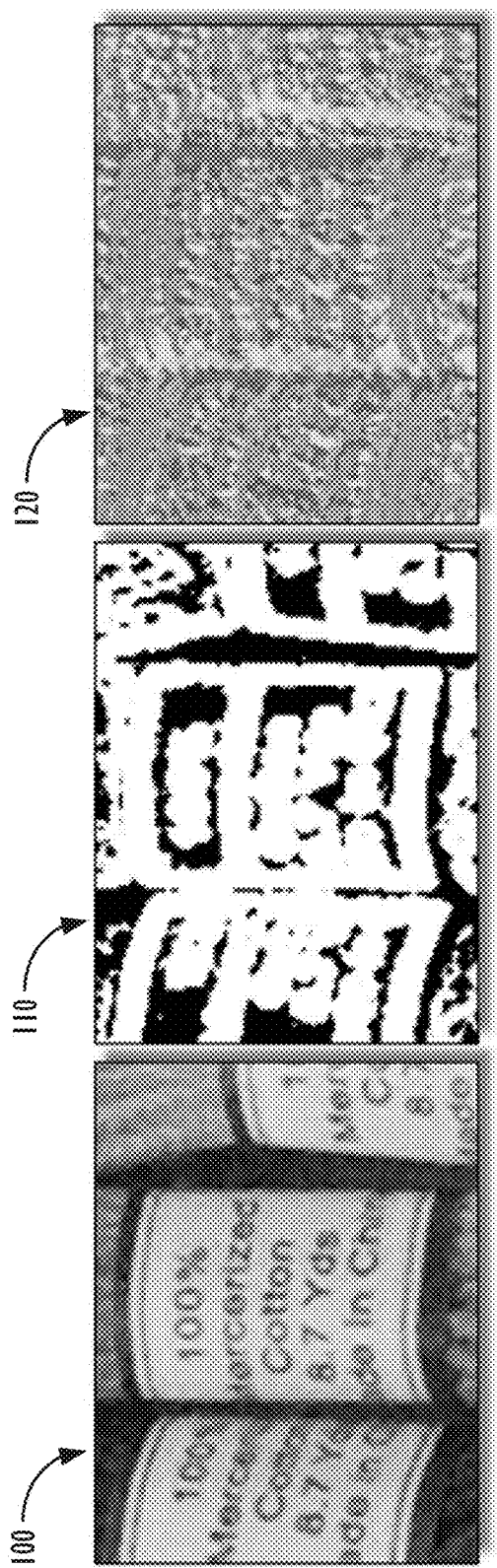
FIG. 1A is an example of an image for which a "feature map" and a "direction vector field" have been calculated.
FIG. 1B is an example of a feature map for the image shown in FIG. 1A.
FIG. 1C is an example of a direction vector field for the image shown in FIG. 1A.
Figure 2:
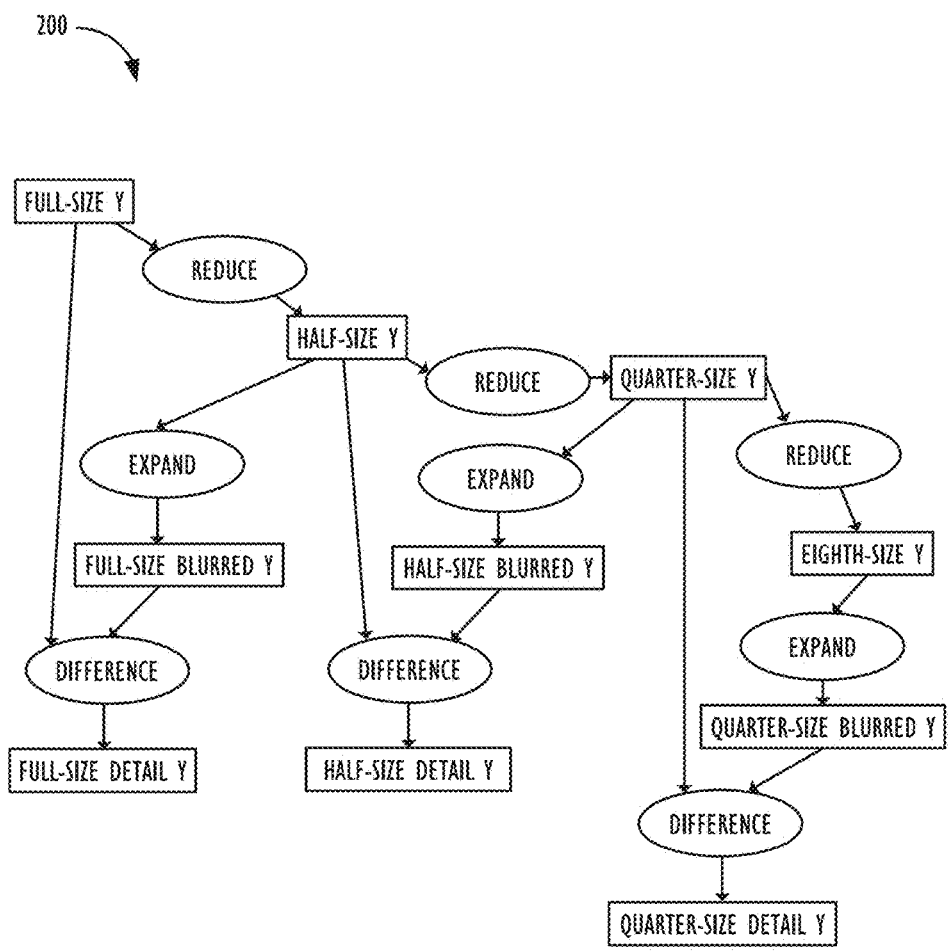
FIG. 2 shows an exemplary process for extraction of a Laplacian pyramid.

FIG. 2 shows the flow of exemplary process 200 for extraction of the Laplacian pyramid. The full-size Y is the single source for this process. The products of this process are (1) the various levels of detail and (2) the smallest image in the set. It's important to realize that the smallest image defines the gray levels of the image, and that the detail products are just deltas to larger-sized versions. Laplacian pyramid decomposition can be fully described by the "reduce," "expand," and "difference" operations.

Figure 3:
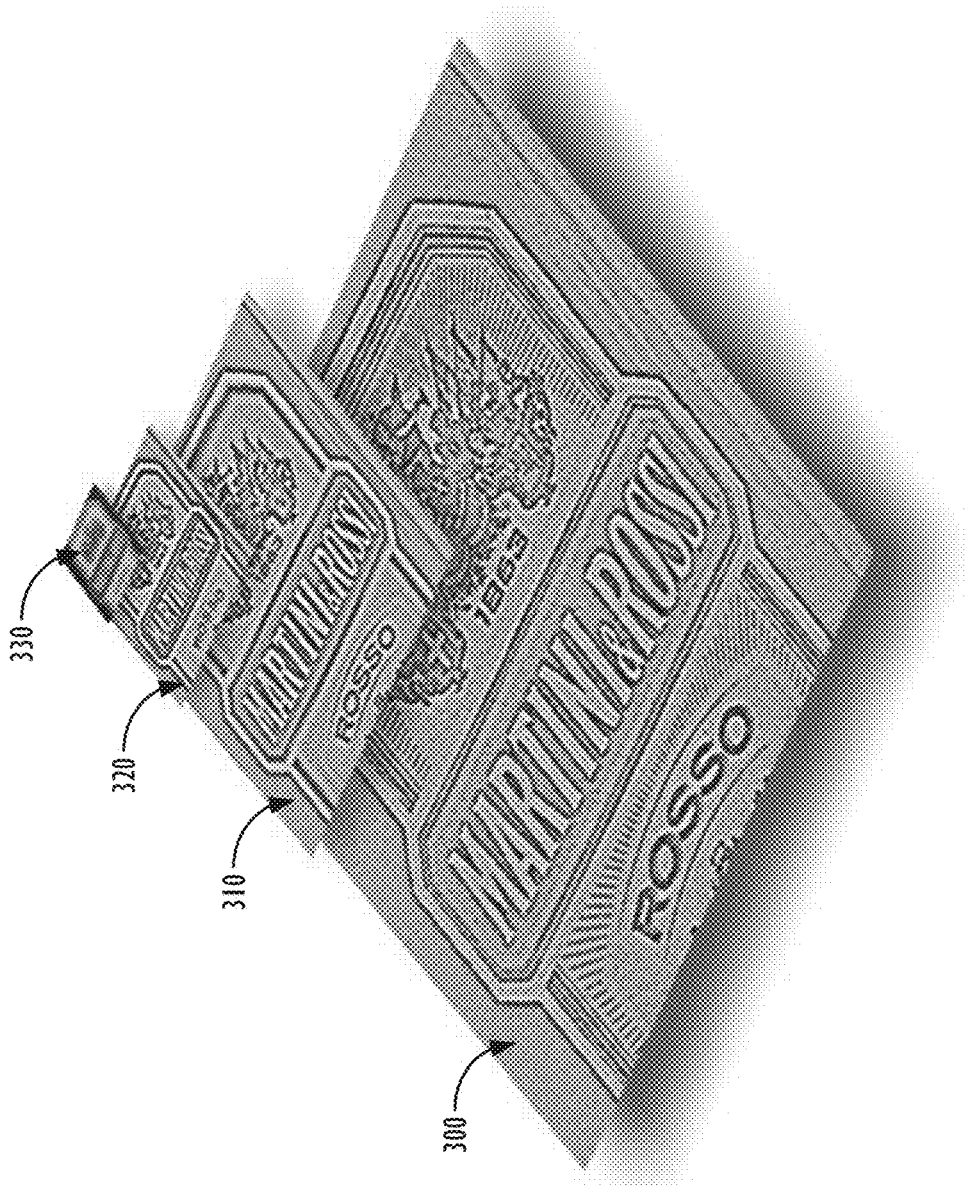
FIG. 3 shows an exemplary Laplacian pyramid having four levels.

As shown in FIG. 3, the Laplacian pyramid consists of the full-size Y detail 300, the half-size Y detail 310, the quarter-size Y detail 320, and the eighth-size Y detail 330. The eighth-size Y detail is kept specifically to retain the gray levels of the image because the detail channels at the lower levels of the pyramid are all kept as deltas from it. The luminance (Y) of the image is thus kept in a storage that is approximately ⅔ of the original size. Though it is not shown, the full-size Y, half-size Y, and the quarter-size Y images may also be kept, as they make a better source from which to extract the gradient vector field. However, when the image is smoothed, the detail channels are smoothed directly because they are added to the resized smaller images from higher up the pyramid, which carry the proper gray levels of the image since the cumulative reconstruction is based on the eighth-size Y detail.

Now, the "reduce," "expand," and "difference" operations used in constructing the Laplacian pyramid will be discussed in greater detail.

Loading a 5×5 Neighborhood of Samples

Loading a neighborhood of sample values is fairly easy, only complicated by what to do when samples in a neighborhood array need to be fetched from outside the source image. In the sample code for LoadNeighborhood( ) edge pixels are replicated by pinning the source coordinates to the source image, as is shown in the pseudocode below:

```
// load 5X5 neighborhood N centered on source[r, c]
void LoadNeighborhood(luminance_image *source, int r, int c,
   float N[25]))
{
    int ro, co, row, col, i;
    for (ro = -2, i = 0; ro <= 2; ro++)
        for (co = -2; co <= 2; co++)
        {
            row = min(max(r + ro, 0), source->height-1);
            col = min(max(c + co, 0), source->width -1);
            N[i++] = source->body[row, col];
        }
}
```

For a real implementation, though, extra comparisons in the inner loop of our calculations are not desirable, so the source may be padded (e.g., by replicating edge pixels) and the bounds of the area calculated may simply be inset.

Convolving a Neighborhood with a Coefficient Array

In the sample pseudocode below, a neighborhood is encoded as a 25-element array. This is also true of the coefficient arrays used in the process. This makes the function of the Convolve( ) method easy to state: it is a dot product of the two arrays, as is shown in the pseudocode below:

```
int Convolve(float A[25], float B[25], float factor)
{
    int i;
    float sum;
    sum = 0;
    for (i = 0; i < 25; i++)
        sum += A[i] * B[i];
    round = factor/2;
    return sum/factor;
}
```

A shift amount may also be included, depending upon how the coefficient array is prepared.

The 'Reduce' Step

When reducing, every fourth pixel (i.e., the pixel within a 2×2 array of pixels with both an even row number and an even column number) may be convolved using a simple Gaussian blur. In the following pseudocode snippet, the coefficient array, CA, is convolved with the image to arrive at the blur sum for the center pixel. Once the sum is formed, the result is scaled back down by Convolve( ) and then divided by 256, i.e., the sum of all elements of CA. Then the other 3 pixels are simply omitted, using a process called "decimation." This has the natural effect of reducing the image size by a factor of two in both dimensions, as is shown in the pseudocode below:

```
float CA[25] =
{
    1, 4, 6, 4, 1,
    4, 16, 24, 16, 4,
    6, 24, 36, 24, 6,
    4, 16, 24, 16, 4,
    1, 4, 6, 4, 1
};
void Reduce(luminance_image *source, luminance_image *destination)
{
    int r, c;
    float N[25];
    for (r = 0; r < source->height; r += 2)
    {
        for (c = 0; c < source->width; c += 2)
        {
            LoadNeighborhood(source, r, c, N);
            destination->body[r/2, c/2] = Convolve(N, CA, 256);
        }
    }
}
```

The 'Expand' Step

To expand, the reduce step is followed in reverse. A full-size temporary image temp is built up with all the pixels of the half-size source image, but with the rest of the pixels zero. This makes the image twice the original size. Then each of the larger image pixels is convolved with the blur filter (even the pixels that have 0's in them). Because ¾ of the larger file's pixels are 0, the process must multiply the blur result by 4 to get the larger image at full brightness. This is accomplished by only dividing the result by only 64, instead of 256. Once expanded, the process has a blurry image expanded to twice the scale of the smaller image, as is shown in the pseudocode below:

```
float CA[25] =
{
    1, 4, 6, 4, 1,
    4, 16, 24, 16, 4,
    6, 24, 36, 24, 6,
    4, 16, 24, 16, 4,
    1, 4, 6, 4, 1
};
void Expand(luminance_image *source, luminance_image *destination)
{
    int r, c;
    float N[25];
    luminance_image *temp =
      new_luminance_image(destination->width, destination>height);
    for (r = 0; r < destination->height; r++)
        for (c = 0; c < destination->width; c++)
            temp[r, c] = 0;
    for (r = 0; r < source->height; r++)
        for (c = 0; c < source->height; c++)
            temp[2*r, 2*c] = source[r, c];
    for (r = 0; r < destination->height; r++)
        for (c = 0; c < destination->width; c++)
        {
            LoadNeighborhood(temp, r, c, N);
            destination[r, c] = Convolve(N, CA, 64);
        }
    dispose_luminance_image(temp);
}
```

The 'Difference' Step

The difference step isolates one band of detail in the image. When the process performs this step, it has both the original image at this size, and the blurry image at this size that is the result of both reducing and then expanding the original. Since the intermediate buffers are kept in integers, the process subtracts the blurry image from the original image to form the difference, then divides the difference by 2 and biases it by ½ (to avoid negative numbers), as is shown in the pseudocode below:

```
void    Difference(luminance_image    *source1,
luminance_image    *source2, luminance_image *destination)
{
    int r, c;
    float p, q, b;
    for (r = 0; r < source1->height; r++)
        for (c = 0; c < source1->height; c++)
        {
            p = source1[r, c];
            q = source2[r, c];
            b = (p - q)/2 + 0.5;
            destination[r, c] = b;
        }
}
```

How an Image is Smoothed

The process may next split the smoothing of an image into two conceptual pieces. The first piece extracts the edge direction vector field and the gradient magnitude map from the image Y (luminance) channel. The second piece computes the smoothed Y (luminance channel) given the image detail, the half-size image, the edge direction vector field, and the gradient magnitude map.

Figure 4:
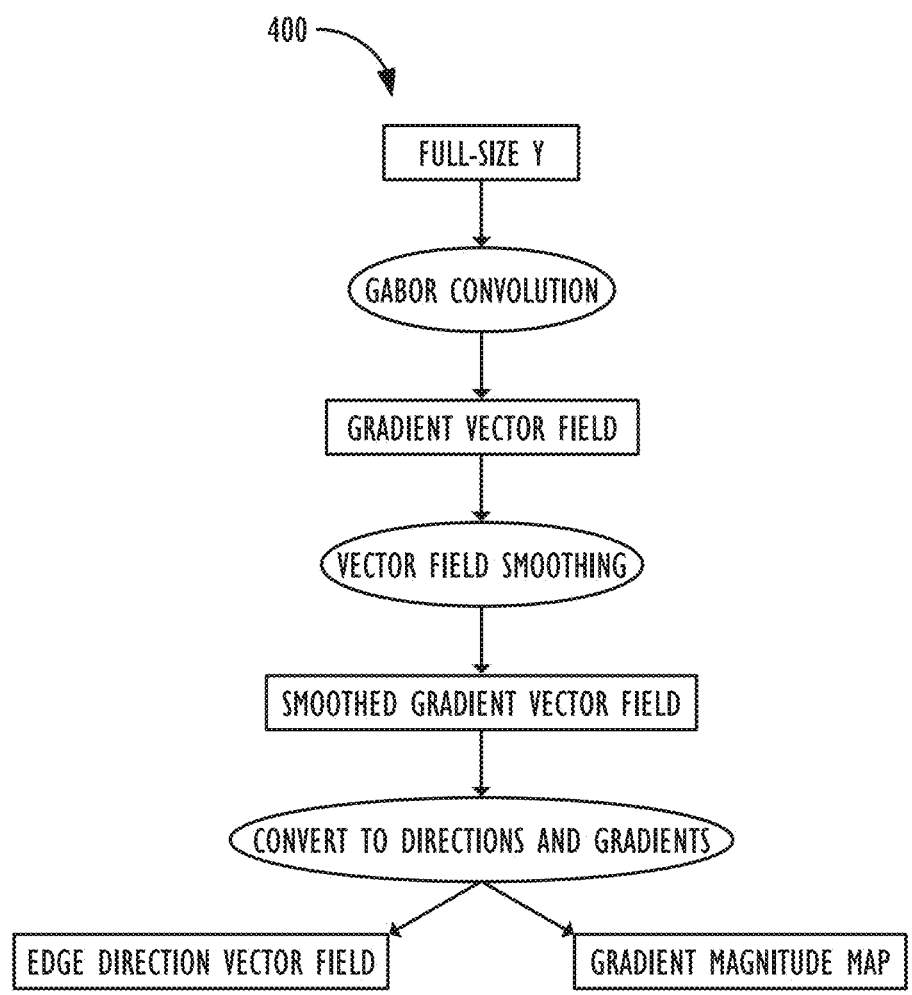
FIG. 4 shows an overview of a first piece of an image smoothing process.

FIG. 4 shows an overview of the first piece of the image smoothing process 400. Here, the sole input is the full-size Y (the term full-size is used here for the local full-size data). This piece may be understood by describing the Gabor convolution step, the vector field smoothing step, and the convert to directions and gradients step.

Here, the gradient vector field consists of a two-dimensional array of (vx, vy) pairs stored in floating point. Each vector points perpendicular to the edge and has a length that is proportional to the contrast of the edge. Small variances in vector direction are corrected in the vector smoothing step. Finally, the conversion step produces the edge direction vector field, which consists of unit-length (normalized) vectors, (ux, uy) pairs, pointing along the edge, and the gradient magnitude map, consisting of two-dimensional arrays, with each element containing a scalar length designating the contrast of the edge.

Figure 5:
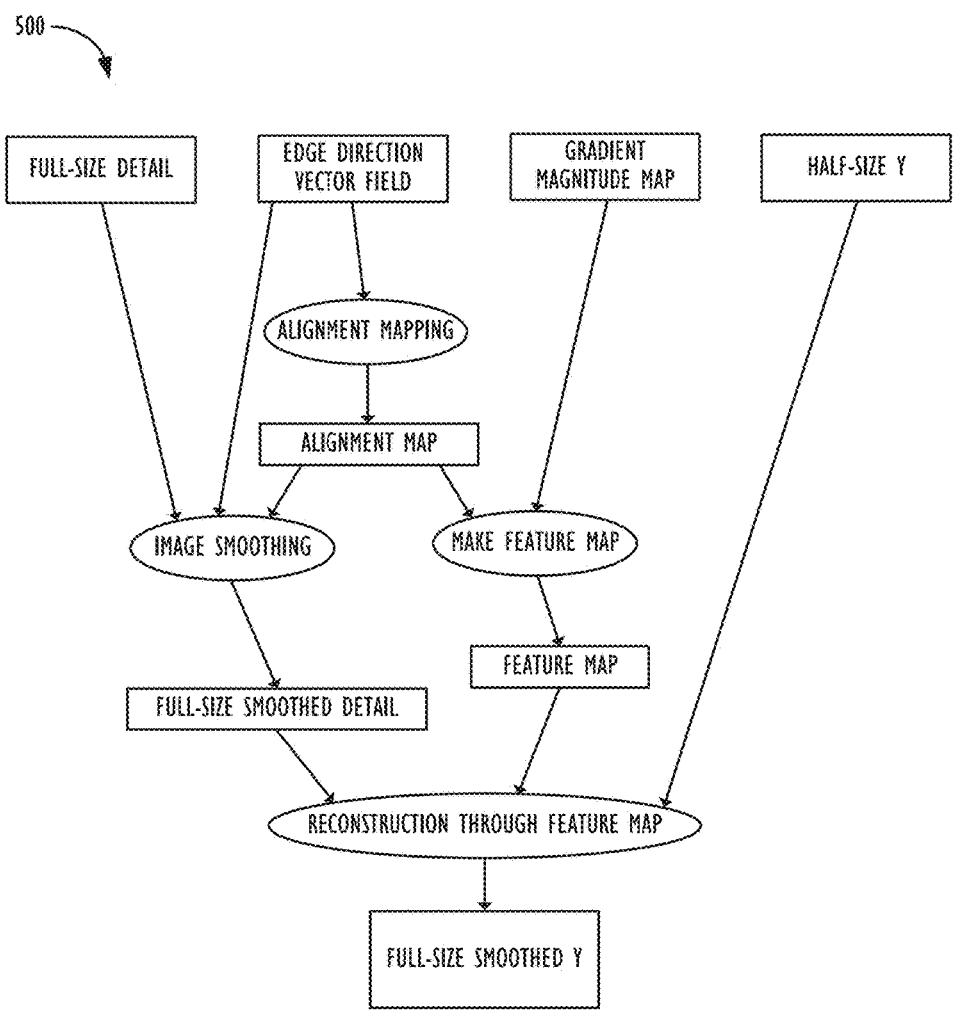
FIG. 5 shows an overview of a second piece of an image smoothing process.

FIG. 5 shows an overview of the second piece of the image smoothing process 500. Here, the inputs include the full-size detail and the half-size Y, from the Laplacian pyramid decomposition process, as well as the edge direction vector field and the gradient magnitude map from the first piece of the smoothing process. This piece may be understood by describing the alignment mapping step, the make feature map step, the image smoothing step, and the reconstruction through feature map step.

Before describing the Gabor convolution, the Gabor filter and the use of Gabor filter jets will first be described in some detail, in order to show how the simpler convolution is derived.

The Gabor Filter

Figure 6:
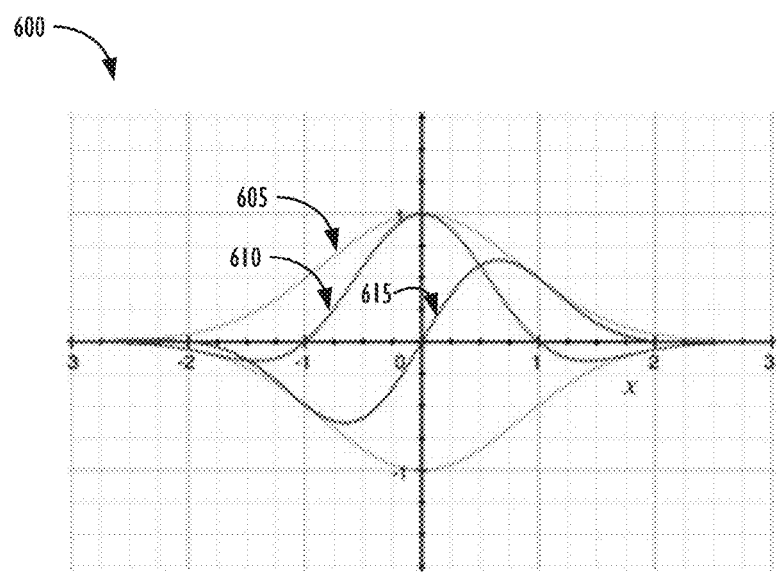
FIG. 6 shows an example of a Gabor filter, as well as its real and imaginary parts.

A Gabor filter is an angle-adjustable filter that may be convolved with an image neighborhood to produce accurate edge direction and gradient information. The Gabor filter centered at (0, 0), oriented along angle θ, wavelength λ, compression γ, and size a at location (x, y) is given by the following:

$$G(x, y; \theta, \lambda, \sigma, \gamma) = e^{i\left(\frac{2\pi x'}{\lambda}\right)} \times e^{\left(\frac{(x')^2 + ((\gamma^2) \times (y')^2)}{2\sigma^2}\right)}, \text{ where}$$

$$x' = (x \times \cos\theta) + (y \times \sin\theta)$$

$$y' = (-x \times \sin\theta) + (y \times \cos\theta),$$

where G consists of a harmonic term multiplied by a stretched Gaussian envelope term (green line—605), and is a complex-valued function. When a cutaway at y=0 is taken, FIG. 6 shows an example of what the real (red line—610) and imaginary (blue line—615) values look like (with X=4.0 and σ=0.7071).

The process specifically uses the imaginary term to extract gradient and direction information, while the real term can be used to smooth in a given direction. Extracting the right (i.e., dimensionally small) scale information from an image requires the other parameters to be set appropriately (e.g., the process may use λ=4.0, δ=0.7071, γ=0.6667).

Gabor Filter Jets

Figure 8B:
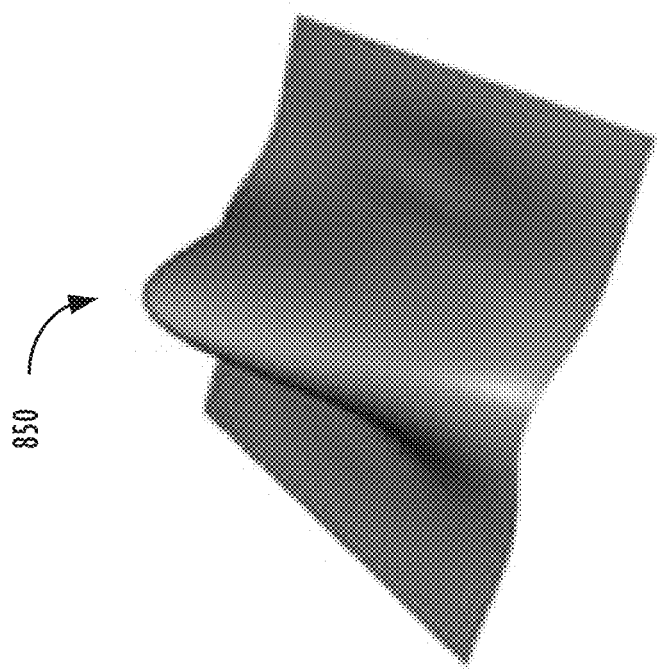
FIG. 8B is a three-dimensional model of an exemplary real part of a Gabor filter jet.
Figure 8A:
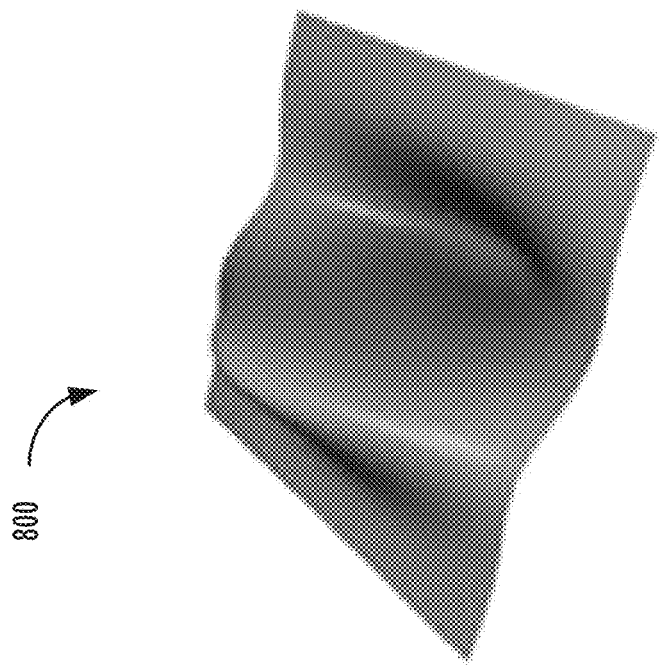
FIG. 8A is a three-dimensional model of an exemplary imaginary part of a Gabor filter jet.

A set of Gabor filters, called a "jet," may be used to extract all structure information from an image at a given scale. A Gabor filter may be designed at a fixed set of angles to do so, e.g.: 16 angles, at fixed 22.5° steps around a circle centered at the point of interest in the image. Turning now to image 700 of FIG. 7A (i.e., the imaginary part) and image 750 of FIG. 7B (i.e., the real part), green regions represent positive areas, red regions represent negative areas, and gray regions represent areas near zero for a jet of sixteen Gabor filters having θ={0°, 22.5°, 45°, 67.5°, 90°, 112.5°, 135°, 157.5°, 180°, 202.5°, 225°, 247.5°, 270°, 292.5°, 315°, 337.5°}. FIGS. 8A and 8B show example sets of Gabor filters 800 and 850, respectively, in three-dimensions so that their shapes may be better appreciated.

Using Gabor Filter Jets for Feature Extraction

Turning to FIGS. 9A and 9B, images 900 and 950, respectively, show close-up views of the Gabor filter specifically designed to respond to angle 0° gradients. By inspecting the imaginary part (image 900), it may be seen that it responds positively to gradients trending from left to right. This occurs on a vertical edge that is the right border of a dark object or the left border of a light object, so the edges are 90° out-of-phase with the gradients.

Next to the imaginary part (image 900) is the real part (image 950), which may be used for smoothing. Its structure shows that the process will blur vertical edges, and the slight negative lobes to either side represent a small amount of sharpening that's applied to the edge. If the structure extraction filter is applied at multiple angles, it may be seen that the first 8 filters are just the negative of the second eight. This means that only 8 of the filters need to be evaluated, and their results may simply be negated to arrive at the other 8 results. If the directional smoothing filter is applied at multiple angles, the first 8 filters simply become duplicates of the second eight. As it turns out, only one filter per pixel needs to be evaluated, i.e., the filter that corresponds to the angle that is detected using the structure extraction pass.

Gabor Vector Fields

Gabor filter jets are a set of Gabor filters designed to capture the impulse response of the edge magnitude at fixed discrete angles. In this way, it is possible to extract the amount of energy from the image at the spot that aligns with the particular direction.

Figure 10:
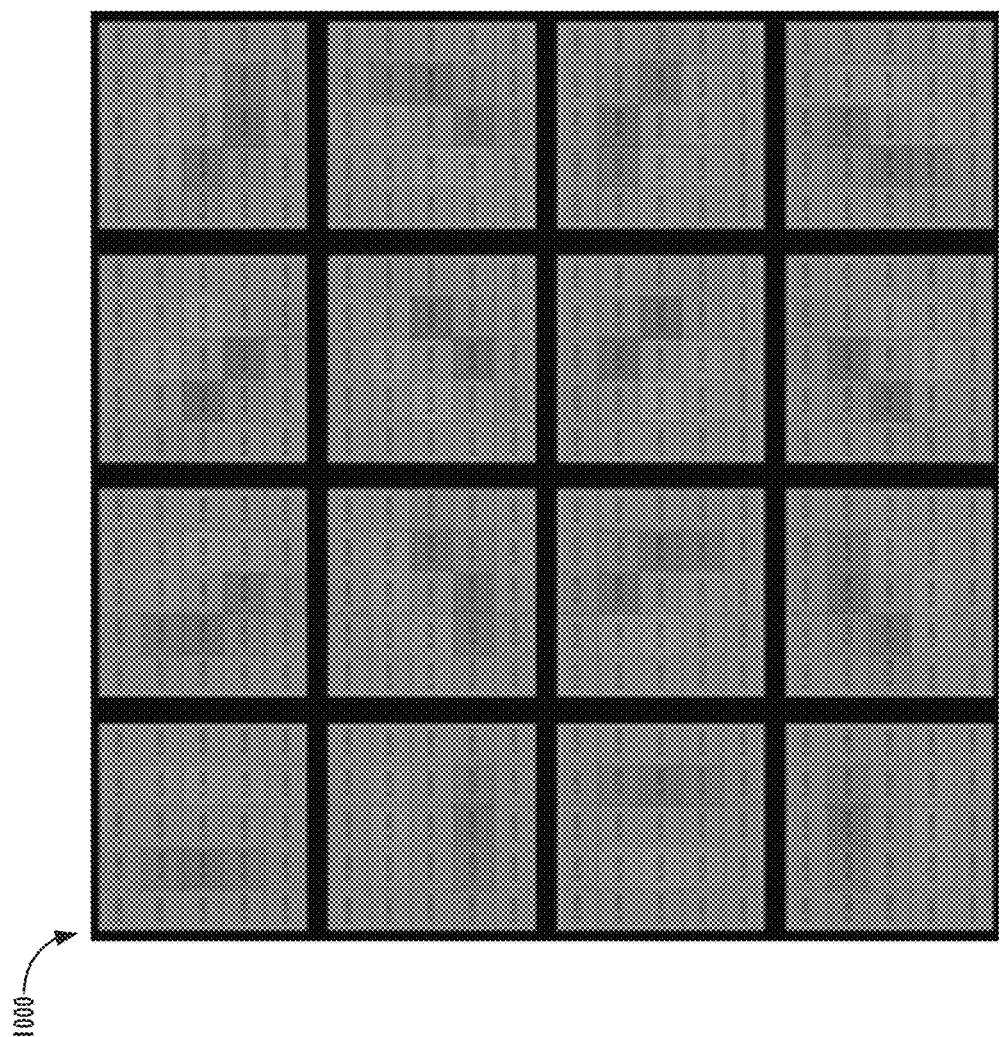
FIG. 10 shows sixteen Gabor filters in a full 360-degree jet of filters.

FIG. 10 shows sixteen Gabor filters in a full 360-degree jet of filters 1000 designed to produce impulse response for edge magnitude at intervals of 22.5 degrees. Green elements show positive coefficients and red elements show negative coefficients. Those near zero tend to become gray.

Figure 11:
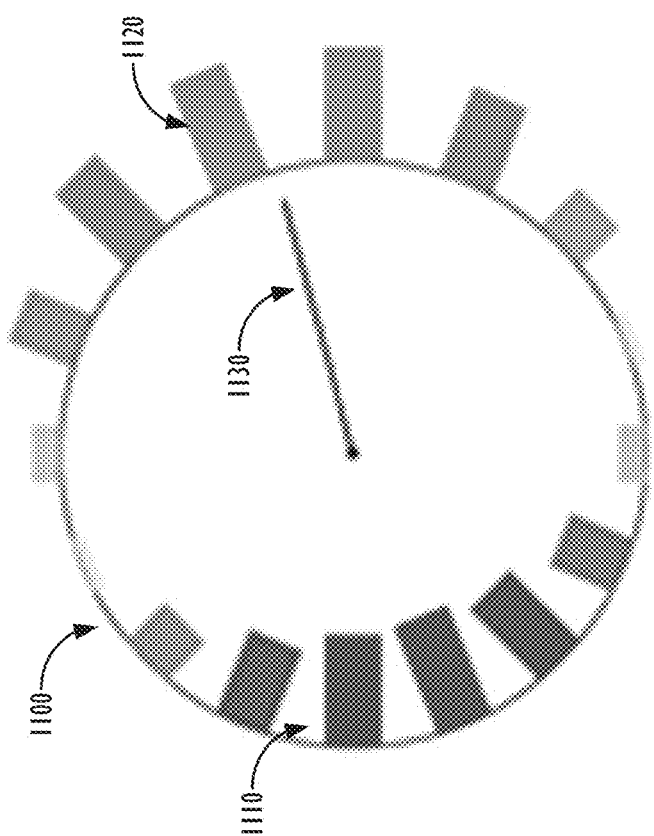
FIG. 11 is an exemplary filter impulse response circle.

As is shown in FIG. 11, if the filter is evaluated at a given spot in an image, and the impulse response of each filter (e.g., 1110/1120) is arranged around a circle 1100, there is a suggestion of a peak that corresponds to the angle perpendicular to the edge in the image at that spot (i.e., pointing towards areas of increased luminance).

Also note that there is some redundancy. The impulse response on one side of the circle 1100 is the exact negative of the impulse response at the antipode. Rather than finding the maximum impulse responses and interpolating between them to determine direction at the spot, it is actually simpler conceptually to multiply the impulse response at each angle by the 2D unit vector signifying that angle. Then the process may add up the 2D scaled unit vectors to produce a properly arbitrated direction vector (1130). The direction vector also has a very good gradient magnitude as its length (not shown). Since all the operations are linear and can thus be combined, it suffices to do only two convolutions to determine the x- and y-components of the direction vector at the spot.

Gabor Convolution

A convolution may be thought of in the following way: assume that, at any pixel, p, in the image, a 7×7 neighborhood of pixels surrounds the pixel p. Multiply those pixels by corresponding pixels in the 7×7 coefficient array and form the sum of all the products to compute the convolution result for p. Here, two convolutions are applied. One produces the vector x value and the other produces the vector y value:

x Coefficients:

$$\begin{bmatrix} -0.00001 & -0.00010 & -0.00029 & 0.00000 & 0.00029 & 0.00010 & 0.00001 \\ -0.00016 & -0.00198 & -0.00896 & 0.00000 & 0.00896 & 0.00198 & 0.00016 \\ -0.00087 & -0.01793 & -0.1756 & 0.00000 & 0.17565 & 0.01793 & 0.00087 \\ -0.00158 & -0.04426 & -0.54229 & 0.00000 & 0.54229 & 0.04426 & 0.00158 \\ -0.00087 & -0.01793 & -0.17565 & 0.00000 & 0.17565 & 0.01793 & 0.00087 \\ -0.00016 & -0.00198 & -0.00896 & 0.00000 & 0.00896 & 0.00198 & 0.00016 \\ -0.00001 & -0.00010 & -0.00029 & 0.00000 & 0.00029 & 0.00010 & 0.00001 \end{bmatrix}$$

y Coefficients:

$$\begin{bmatrix} 0.00001 & 0.00016 & 0.00087 & 0.00158 & 0.00087 & 0.00016 & 0.00001 \\ 0.00010 & 0.00198 & 0.01793 & 0.04426 & 0.01793 & 0.00198 & 0.00010 \\ 0.00029 & 0.00896 & 0.17565 & 0.54229 & 0.17565 & 0.00896 & 0.00029 \\ 0.00000 & 0.00000 & 0.00000 & 0.00000 & 0.00000 & 0.00000 & 0.00000 \\ -0.00029 & -0.00896 & -0.17565 & -0.54229 & -0.17565 & -0.00896 & -0.00029 \\ -0.00010 & -0.00198 & -0.01793 & -0.04426 & -0.01793 & -0.00198 & -0.00010 \end{bmatrix}$$

$-0.00001 \quad -0.00016 \quad -0.00087 \quad -0.00158 \quad -0.00087 \quad -0.00016 \quad -0.00001$ These two convolutions are similar to Sobel gradient convolutions, except they are significantly more accurate at determining the angle of the edge. According to some embodiments, the process may use a 7×7 array because it yields a larger width to the edges that are captured. Getting a larger width is becoming more and more important as megapixel counts go up in modern image capture devices, with the attendant image features getting larger and larger, as well.

Figure 12:
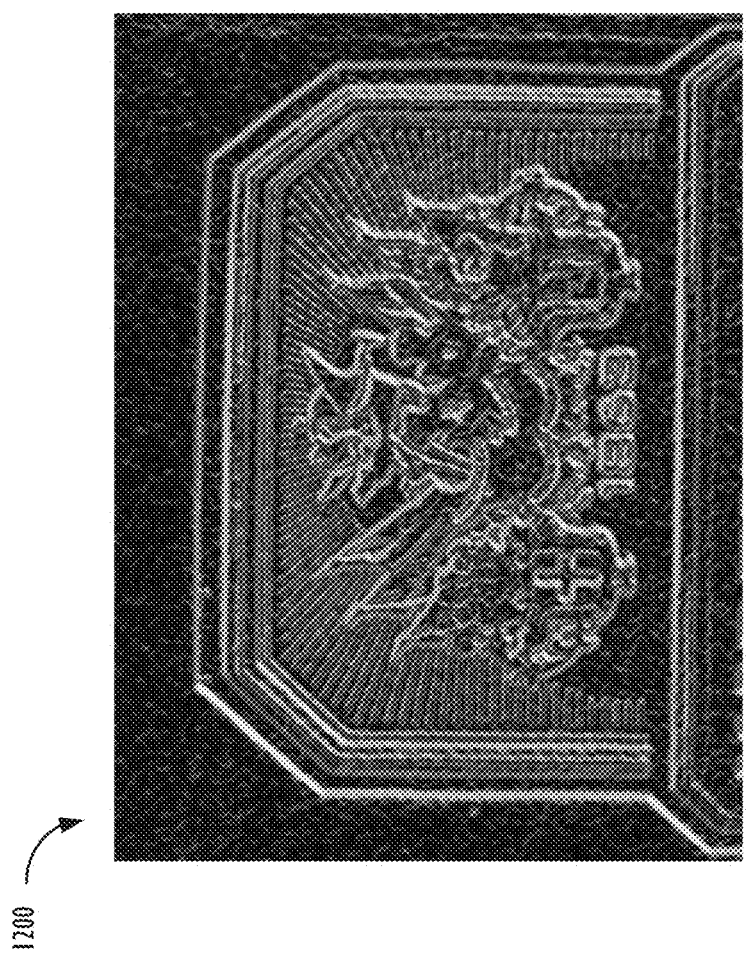
FIG. 12 is an exemplary gradient vector field.

This technique can produce a vector at each pixel of an image. The (x,y) vector points perpendicular to the edge (i.e., from dark towards light), and has length proportional to the edge strength (i.e., the edge's 'straightness'). This is referred to herein as a "gradient vector field," shown, e.g., in image 1200 of FIG. 12. The vectors are rotated 90° before being stored, so that they point along the edge. The angle of the vector field is shown as hue, and the magnitude is shown as luminance. A vector field may be stored as a two-dimensional array of vectors, where each vector contains an x- and a y-component. A vector may be stored in Cartesian form, but can also be converted to polar form. This means extracting its length may be done separately from extracting its angle.

Figure 13A:
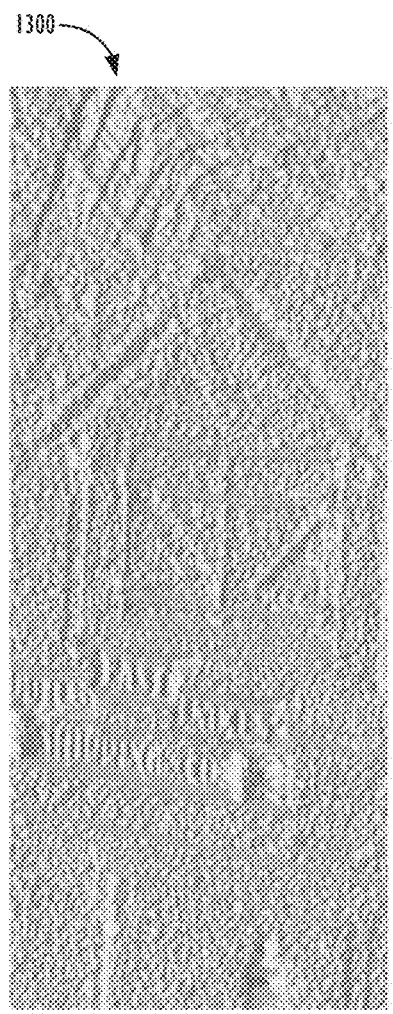
FIG. 13A is an exemplary gradient vector field.

In a gradient vector field, as is shown in image 1300 of FIG. 13A, the image's luminance is modeled a height field where darker luminance pixels represent the valleys and lighter luminance pixels represent the mountains. Each vector's length is the steepness of the luminance slope at the pixel. Each vector's direction points uphill, i.e., from dark towards light. Then, of course, the vectors are rotated 90° so that they align with the edge. On a thin edge, the vectors on one side will point the opposite direction from vectors on the other side.

Figure 13B:
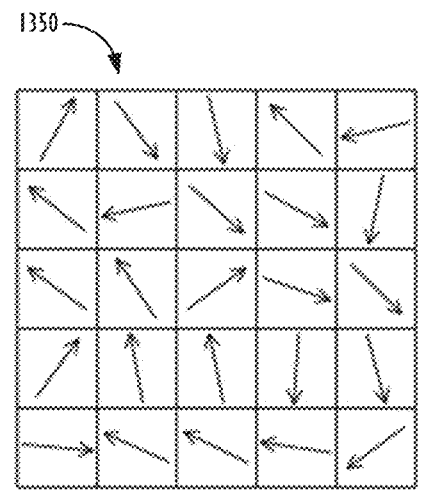
FIG. 13B is an exemplary vector field.

A vector field can also be a convenient domain for processing. If the vector field is blurred, for instance, a rudimentary form of noise reduction may be accomplished. In noisy images, the vectors in a local area often point in many different directions, as is shown in image 1350 of FIG. 13B. Blurring the vector field makes the directions cancel and reduces the length of the vectors in areas of noise. It is noted that colors are often used to represent directions in the vector field because the directions can be any angle, i.e., from 0° to 360°. The most natural way to express angles for an image is by using the hue wheel (borrowed from color science).

Smoothing the Vector Field

Figure 14C:
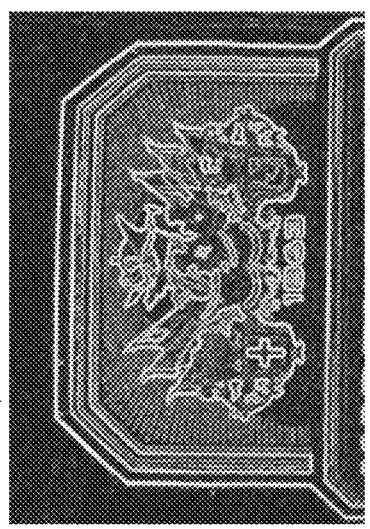
FIG. 14C is an exemplary gradient magnitude map for the image in FIG. 14A.
Figure 14B:
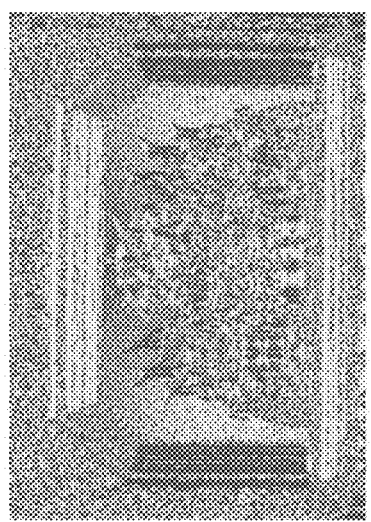
FIG. 14B is an exemplary edge direction vector field for the image in FIG. 14A.
Figure 14A:
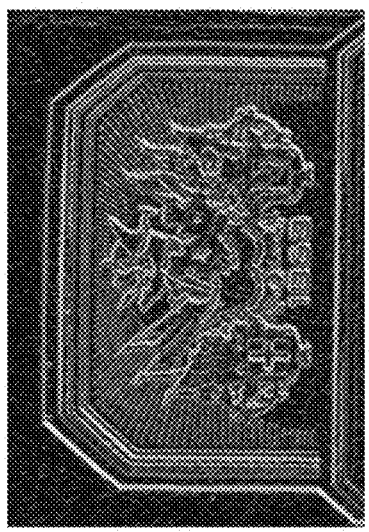
FIG. 14A is an exemplary gradient vector field.

The gradient vector field, e.g., as shown in image 1400 of FIG. 14A, may be processed some amount before it is split up into direction vectors and gradient magnitudes. The vector field gets smoothed by first estimating a more accurate direction estimate. Three normalized directions along the line get combined using a weighted average to produce a better arbitrated normalized direction vector. Then this direction is used to sample five vectors along the line. These 'un-normalized' vectors are then combined using a weighted average to make a smoothed vector. Here is pseudocode for accomplishing this. Here, a subscript is taken to mean an interpolated lookup from the vector field at the location:
smoothing vectorfield v at point p
  vector c1, c2, w1, w2, w3, w4, smoothed;

$c1=v[p]$;

$w1=v[p-c1]$;

$w2=v[p+c1]$;

$c2=\text{normalize}(w1+2*c1+w2)$;

$w1=v[p-2*c2]$;

$w2=v[p-c2]$;

$w3=v[p+c2]$;

$w4=v[p+2*c2]$;

smoothed=$w1+4*w2+6*c2+4*w3+w4$;

Realizing that all the vectors in the gradient vector field cannot be smoothed in this way, the process may now seek to prevent corners from being smoothed. The process may evaluate average unit-length direction vectors both upline and downline, and then use this information to decide which average most clearly matches the vector at the pixel. Then, the process may use the angle between the directions to decide whether or not the corner is strong enough to warrant preventing it from being smoothed. This can be determined by using a dot product between the two vectors. Corner preservation is accomplished by replacing the smoothed vector by either the upline or downline average. The result is made to have the same length as the original vector at the pixel, and not to point in an opposite direction, as is shown in the pseudocode below:
corner preservation
  vector a1, a2, csmoothed;

$a1=\text{normalize}(w1+w2)$;

$a2=\text{normalize}(w3+w4)$;

csmoothed=$\text{dot}(a2-a1,c2)<0?(w1+w2)/2:(w3+w4)/2$;

smoothed=$(\text{dot}(a1,a2)<0.1)?\text{csmoothed}:\text{smoothed}$;

smoothed*=$\text{length}(c1)/\text{length}(\text{smoothed})$;

smoothed=$(\text{dot}(\text{smoothed},c1)<0)?-\text{smoothed}:\text{smoothed}$;

Finally, the process may look across thin lines to even out the magnitude and direction of the center of the thin line, to aid in the smoothing process later. The process may use the smoothed vector result and construct a unit-length perpendicular to it. The process may use this to sample vectors across the line to either side of the pixel. If the vectors to either side point in suitably opposite directions (as occurs on the opposite sides of thin lines) then the process may raise the magnitude of the smoothed vector at the pixel to match the maximum magnitude of the vectors to each side, as is shown in the pseudocode below:

thin line widening
  vector n, np, a, b;
  float mag;

$n=\text{perpendicularTo}(n)$;

$np=\text{normalize}(w3+w4)$;

$a=v[p-n]$;

$b=v[p+n]$;

mag=$\max(\text{length}(a),\text{length}(b))$;

smoothed=$(\text{length}(\text{normalize}(a)-\text{normalize}(b))<0.8)?$
    $(\text{mag}*n):\text{smoothed}$;

Converting to Directions and Gradients

The process may then process the gradient vector field into an edge direction vector field, e.g., as is shown in image 1410 of FIG. 14B. The edge direction vector field contains normalized (i.e., unit length) directions that are aligned with the edges (rather than perpendicular to them). Here, the angle of the direction (wrapped onto a range of 180 degrees) is shown as hue.

Simultaneously, the process may process the gradient vector field into the gradient magnitude map, shown in image 1420 of FIG. 14C as grayscale luminance. The gradient magnitude map consists of the lengths of the gradient vectors and allows the process to view the strength of the edges. As may be seen, the edge strength is entirely independent of the angle of the edge. Shown below is the simple pseudocode for splitting a vector into a unit-length direction vector and a scalar gradient magnitude:
converting vectorfield v into vectorfield edvf and luminance_image gmm at point p
  vector c;

$c=v[p]$;

$edvf[p]=\text{normalize}(c)$;

$gmm[p]=\text{length}(c)$;

Alignment Mapping

Many of the subtler features of the image are "in the noise." This means that their gradient magnitudes are comparable with the gradient magnitudes of the noise in the same area of the image, and so the features hide in the noise itself. Therefore, to preserve the subtler features of the image, the process may now delve "into the noise" and find features that otherwise will be obscured by the noise. To do this, the process may look at the gradient magnitude map and the usual process of creating the feature map for an exemplary image, e.g., image 1500, shown in FIG. 15A, that has a feather on the left hand side and a kaleidoscope with a florette on the right hand side. Shown in image 1510 of FIG. 15B, the details in the feather (to the left of the florette on the kaleidoscope) are very light. Since the noise floor is high in the gradient magnitude map, the process may be forced to set a high threshold to eliminate the noise when making a typical "feature map," as will be discussed in further detail below. This process results in a feature map that doesn't preserve any of the striations of the feather, although the florette on the kaleidoscope is perfectly preserved.

However, there is an additional place the process may look for the detail: the edge direction vector field. The edge direction vector field for image 1500 is shown in image 1520 of FIG. 15C, with the angle of the direction vector depicted as hue with a full 360-degree range. As may be seen, the striations of the feather 1525 are clearly visible on the left hand side of the image.

Figure 16:
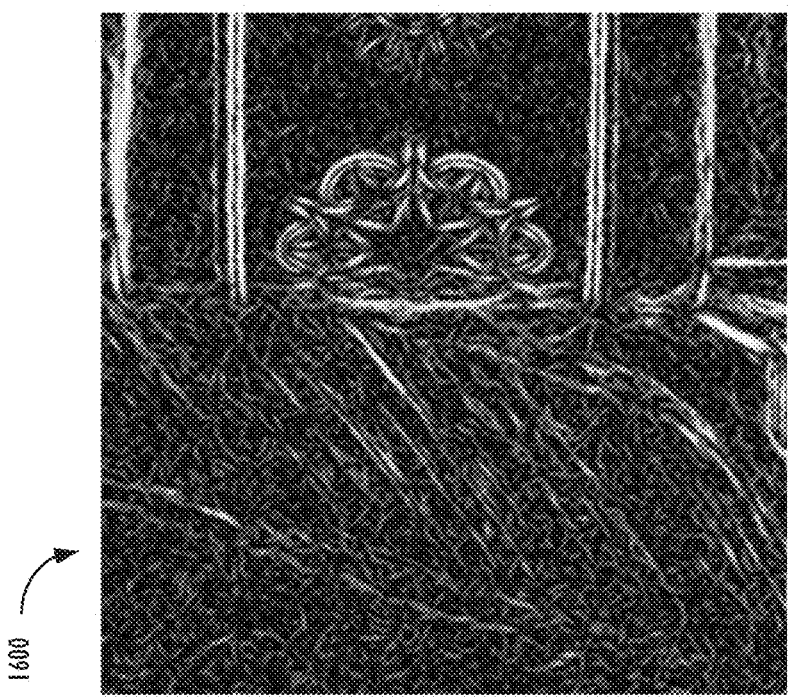
FIG. 16 is an example alignment map for an exemplary image.

The process may therefore create a map that shows how well the vectors along an edge align with nearby vectors that also occur along that same edge. This map is herein referred to as the "alignment map," an example of which is shown in image 1600 of FIG. 16. This map is shown as a heat map, i.e., the "hotter" an area is, the more (and the farther) the vectors along the edge align with each other. Computing this map in the presence of strong noise is an interesting problem, owing at least in part to the fact that direction vectors in noisy areas don't always correlate. This means they don't line up, on the average, for very many pixels. Alignment map construction takes advantage of this fact.

The alignment map comes entirely from the edge direction vector field, which contains a unit direction vector at each pixel. Though these vectors tend to follow the edges of the image, they can waver a bit based on the signal-to-noise-ratio at the pixel. So, the process may get a more accurate direction at the pixel by averaging vectors along the edge. But, even this depends upon having an accurate measure of the edge direction. To solve this problem, the process may perform a small iteration to get a good measure of the edge direction at the spot of interest.

Figure 17:
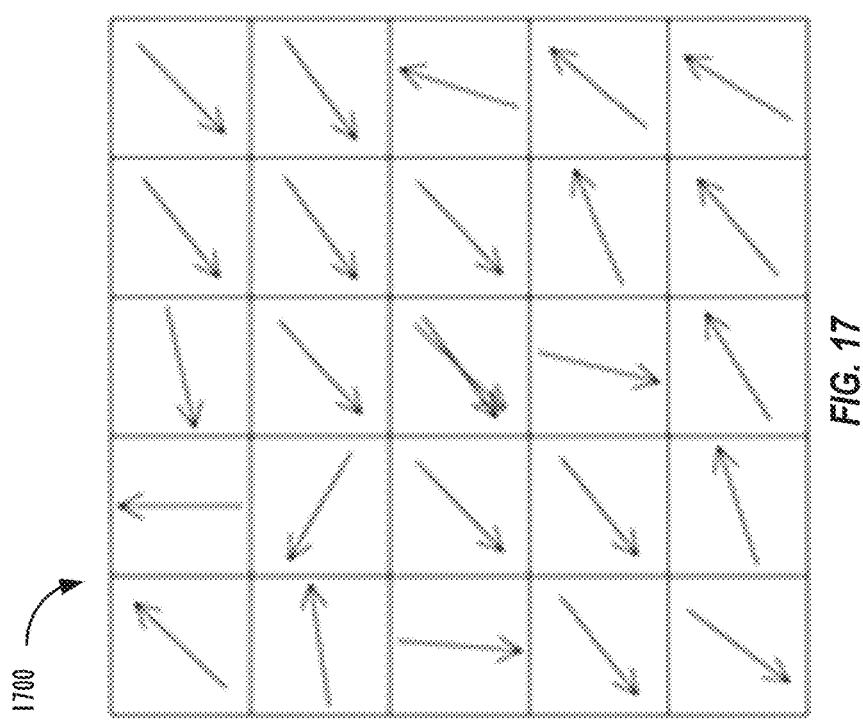
FIG. 17 is an exemplary edge direction vector field from a noise image.

Vectors in the edge direction vector field in a noisy image, e.g., as shown in image 1700 of FIG. 17 (representing the edge direction vectors at the upper edge of a thin diagonal line), can be quite chaotic. But, when a confluence in direction is seen, it is possible to improve direction estimates and also provide a measure of edge confidence without significantly rounding any corners off. Here, the local vectors in an image's edge direction vector field are shown. An initial estimate of the direction at the spot is purely local.

By using the unit direction vector itself as a displacement, the process may easily look up the neighbor vectors along the edge. This is similar to advection. Doing this requires interpolation of the vector field, easily supported by modern GPUs with interpolated texture lookup. If the process looks to either side up and down the edge, it can get the center vector and two "wing" vectors along the edge at distance −1 and +1. The process may then form a 1-2-1 average of these to form a second estimate of the center vector. Then the process may use this new center vector (to define the edge direction) and four additional "wing" vectors along the edge at distance −2, −1, +1, and +2. The process may form a 1-4-6-4-1 average of these to form a third (i.e., arbitrated) estimate of the center direction vector. This is shown in the center of the diagram 1700, with darker vectors representing the newer estimates.

Here is some pseudocode for computing the arbitrated direction estimate at point p in vector field v. Here, the subscript operation implies an interpolated texture lookup. The normalize( ) operation returns the unit-length version of the vector (by dividing it by its length):

```
vector arbitratedDirectionEstimate(vectorfield v, point p)
{
    vector c1, c2, w1, w2, w3, w4, e;
    c1 = v[p];
    w1 = v[p - c1];
    w2 = v[p + c1];
    c2 = normalize(w1 + 2*c1 + w2);
    w1 = v[p - 2*c2];
    w2 = v[p - c2];
    w3 = v[p + c2];
    w4 = v[p + 2*c2];
```

-continued

```
    e = w1 + 4*w2 + 6*c2 + 4*w3 + w4;
    return normalize(e);
}
```

Now the process may use this better estimate of edge direction to evaluate the local alignment of the vectors along the edge. A soft measure of the alignment between two unit vectors is the dot product of the two vectors. The dot product is 1 when the vectors are totally aligned, 0 if they are perpendicular, and −1 if they are pointing in entirely opposite directions. But also, if the vectors are at 60 degree angles to each other, the dot product has a value of one-half. So, the process may limit the dot product to be greater than or equal to zero and raise it to the eighth power. This makes the function return a value of one-half when the two vectors are at a mere 23.5 degree angle to each other instead.

Figure 18:
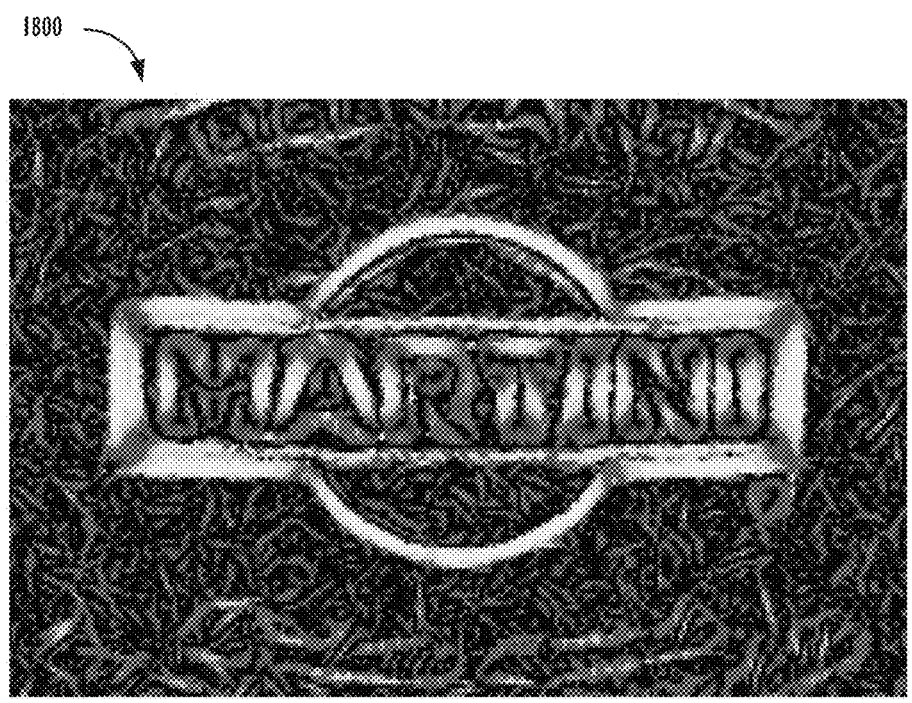
FIG. 18 is an example heat map for an exemplary image.

The dot product is useful in determining whether the vectors are aligned. As is shown in the heat map of image 1800 of FIG. 18, the areas of alignment are primarily the straight edges and gradual curves. At corners, there is considerably less "heat" (and thus alignment). This is fortuitous, because it is not desirable to round off the corners when smoothing.

Determining a Degree of Alignment

According to some embodiments, it is desirable to have some indication of how aligned an edge is, i.e., how long the edge is. This is important because the process needs to know how much it can be smoothed. Longer edges become rough unless they are smoothed along a significant length. Thus, the process may further include a concept referred to herein as "alignment at distance." An edge is aligned at distance d if, when looking both ways along the edge at that distance, both sides are aligned more than a certain threshold amount. Here is some pseudocode to compute the alignment of a vector field's edge at point p with arbitrated direction dir at distance d:

```
float alignmentAtDistance(vectorfield v, point p, vector dir, float d)
{
    float a, w1, w2, d1, d2;
    vector w1, w2;
    w1 = v[p - d*dir];
    w2 = v[p + d*dir];
    d1 = dot(w1, dir);
    d2 = dot(w2, dir);
    a = max(min(d1, d2), 0);
    a *= a;
    a *= a;
    a *= a;
    return a;
}
```

The arbitrated direction and the distance may be used to look up vectors along the edge. Dot products may be used with the arbitrated direction to provide the basic data for alignment. By taking the minimum of the two dot products, the process may ensure that any alignment that is found is present at both sides. By limiting it to be zero or greater, negative alignment (which can happen if one side starts pointing in the other direction) may be avoided. The result is raised to the eighth power to concentrate the alignment score and make the values higher when the vectors are more strongly aligned.

Alignment Score

Next, the process may produce an alignment score for the edge at the point. It is really an average of the alignment at distance over a wide range of distances. This is the technique that produces the heat map of edge alignment, showing cooler regions near corners and hotter regions in the middles of long edges or gradual curves. Here is the pseudocode to produce the edge alignment, given edge direction vector field v and a point p on that field's domain:

```
float alignment(vectorfield v, point p)
{
    int i;
    float sum, a;
    vector dir;
    dir = arbitratedDirectionEstimate(v, p);
    sum = 0;
    for (i = 1; i < 8; i++)
        sum += alignmentAtDistance(v, p, dir, (float)i);
    a = sum/8;
    return max(min(a, 1), 0);
}
```

In summary, it computes the arbitrated direction (which limits the effect of noise and produces a truer direction estimate), and creates the average of the (bidirectional) alignment over a range of distances. This has the effect of being able to weight the alignment based on the effective straightness of the edge. If the edge is highly curved or if it is a corner, then this function will score fairly low. If the edge is highly aligned and has a fairly straight edge, it will score fairly high.

Making the Feature Map

Figures 19A, 19B, 19C:
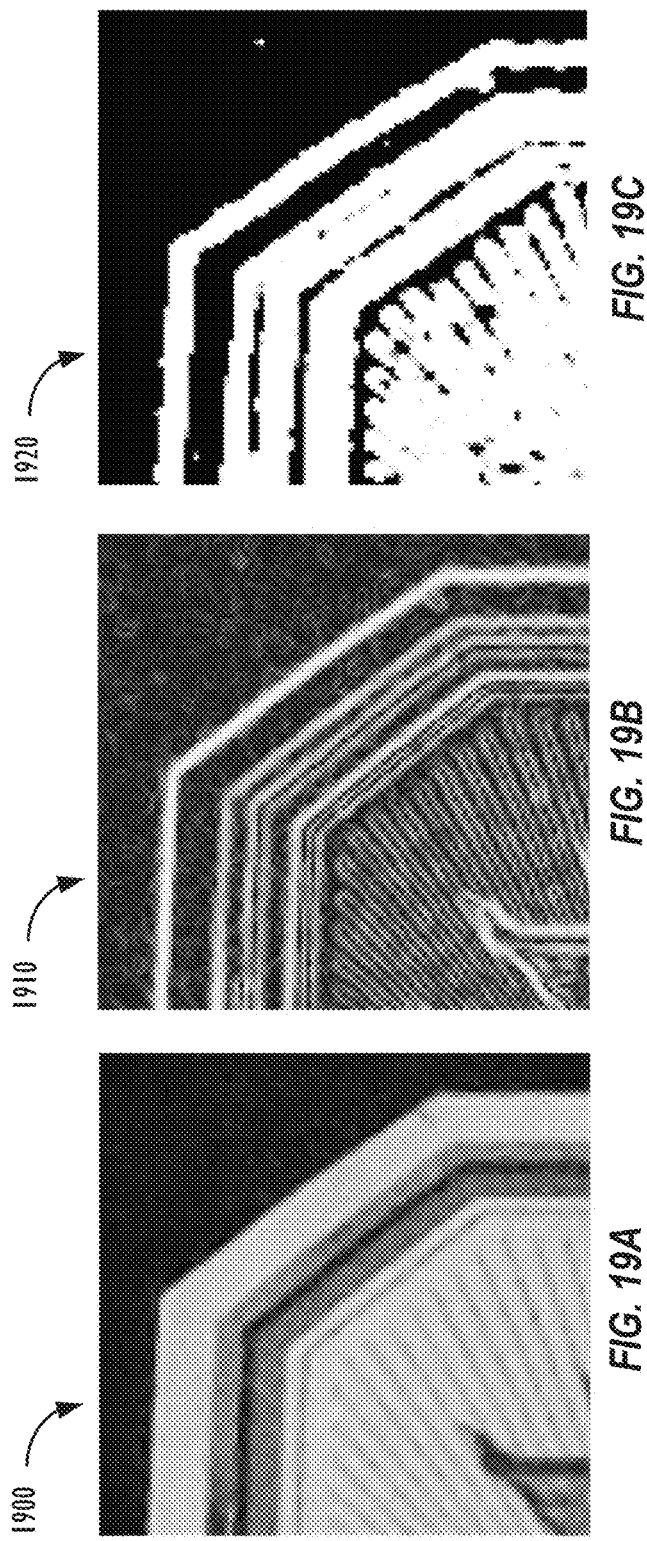
FIG. 19A is an exemplary image for which a gradient magnitude map and feature map may be determined.
FIG. 19B is an example gradient magnitude map for the image of FIG. 19A.
FIG. 19C is an example feature map for the image of FIG. 19A.

When evaluated for the purposes of a feature map, the gradient magnitude map has a few undesirable features. First, noise in the original image (e.g., image 1900 in FIG. 19A) creates tiny, light circles and loops in the gradient magnitude map (e.g., gradient magnitude map 1910 in FIG. 19B). To solve this problem, the process may use a minimum magnitude threshold (below which the image is considered to be entirely noise). Second, some edges are lighter than others. This is because of the edge strength. But, it is often desirable to smooth the lighter edges the same amount as the heavier edges. In actuality, the smoothing operation takes care of the edge strength because it operates directly upon the detail and its strength, which is already present.

To solve this problem, the process may magnify the gradient map and clamp it at a value of 1.0. This also has the fortuitous property of widening the edges a bit (as discussed above). But finally, the centers of thin lines aren't filled in. This makes the feature map's use as a smoothing area somewhat flawed. This is because the centers of thin lines must also be smoothed in order to get a consistently smoothed noise-reduced result. To solve this, the process may blur the thresholded and magnified edge a small amount before clamping it to 1.0. This fills in the centers of thin lines and also widens the edges a bit more in the process. The result of thresholding, magnifying, blurring, and clamping against 1.0 is shown in feature map 1920 in FIG. 19C.

One potential drawback when making the feature map is that some subtle features are completely eliminated by the thresholding process. As the noise in the image grows, the process may be forced to raise the threshold and eliminate stronger and stronger features. To combat this effect, information may be added in from the alignment map.

As mentioned above, the feature map is then used as a mask during reconstruction of the noise-reduced luminance image. This means light areas signify those smoothed full-size details to keep, and dark areas signify which areas are to come from the blurred and resized half-size image. The dark areas become quite flat when this happens, but the light areas can also be quite flat, e.g., in cases where the edges are very faint. This is because of the smoothing performed on the full-size detail image. This smoothing is specified by the alignment map. To get the increased detail, the process may add the alignment map into the feature map using a similar operation to the one applied to the gradient magnitude map.

For example, in the original image 2000 of FIG. 20A, it may be seen that there is additional detail in the blue yarn 2005. More specifically, this can clearly be seen at 2015 in the alignment map (image 2010 of FIG. 20B). Further, this additional detail 2025 is largely not present in the feature map (image 2020 of FIG. 20C), but when the thresholded, scaled, blurred, and clamped alignment map data is added, the new feature map (image 2030 of FIG. 20D) now has the detail 2035 in it.

Figure 21B:
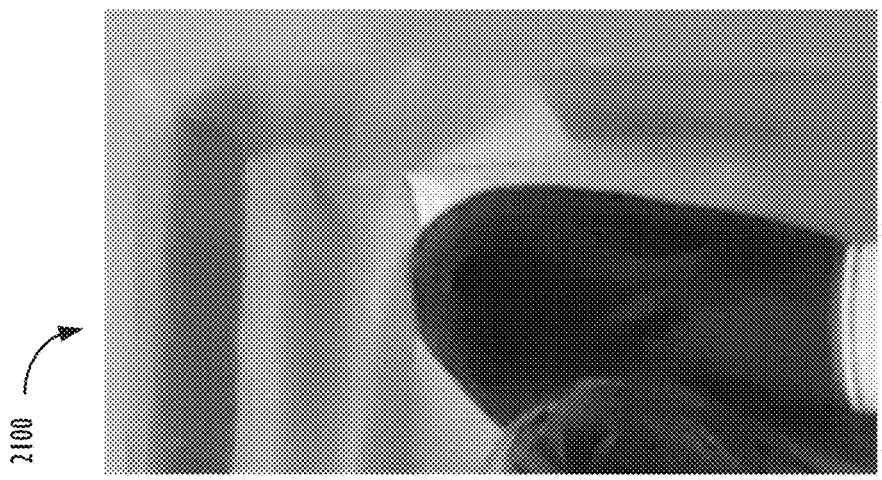
FIG. 21B is an exemplary image having additional detail in a portion of the image.
Figure 21A:
FIG. 21A is an exemplary image having additional detail in a portion of the image.

In image 2110 of FIG. 21B, the addition of detail in the blue yarn (as compared to image 2100 of FIG. 21A) may be seen, as well as additional detail in the subtle borders of the transparent plastic container it sits in (e.g., in the upper right-hand quadrant of image 2110). The smoothed image created using a 'typical' feature map that simply uses an edge finder is shown on the left (i.e., image 2100), and the smoothed image created using an improved feature map that comes from adding the additional alignment map detail is on the right (i.e., image 2110). The same method may be used to resolve the alignment map into an additional smoothing map area. Again, it may be thresholded, scaled, blurred, and then clamped. Finally, the maximum of the feature map and the processed alignment map may be used as the new feature map.

Image Smoothing

When actually smoothing the image, the feature map may be used as a "mask." Where the mask is 'on,' directional smoothing is rendered. Where the mask is 'off,' the resampled half-size image may be used to render a blur. When smoothing the image, the amount of smoothing may be determined by the alignment map, and the direction of the smoothing may be determined by the edge direction vector field.

The alignment map, shown as a heat map in the Figures previously described herein (e.g., FIG. 20B) because it shows the degree of edge alignment at the pixels on the edge, is used to determine the width of the smoothing. In some embodiments, the smoothing is actually done in stages. This is because it can be difficult to get a noisy line to be smooth with a single, small local operation. The more the noise, the more pixels that must be combined to get a smooth edge.

Turning now to image 2200 of FIG. 22A, an idealized edge is shown, as it occurs within an image. The line is actually composed of pixels itself, and a strong gradient occurs at the edge. Now, the smoothed result for the line may be computed on a pixel-by pixel basis. Consider a pixel 2205 near the edge in the image. Typical prior art smoothing operations have used a centric (smoothing) Gabor filter to convolve with the pixels near the edge. This produces a decent smoothing, though its accuracy was limited by the angle-quantization implied by the 22.5-degree steps in the Gabor filter jet, and this often caused over-smoothing, or blurriness. Instead, according to some embodiments described herein, the process may sample the pixels near the edge using the modern GPU technique of "bilinear sampling." In some embodiments, points may be chosen that are specifically aligned with the edge.

Turning now to image 2210 of FIG. 22B, a 3×3 oriented neighborhood of points 2215 may be sampled for the smoothing operation. The edge direction vector field may be suitably normalized to unit length, if useful for computing these point locations. Along the edge, each column of three points may be given the weights 0.25, 0.5, and 0.25. This creates a reasonability weighted result (with emphasis in the center) and also helps to smooth the edge by the addition of extra points. The center column becomes the smoothing term. But, the outer columns are also used for creating a slight sharpening. This is used to reconstruct the edge because of the loss of contrast inherent in smoothing. The three columns may be given the weights −0.25, 0.5, −0.25, in the manner of a one-dimensional Laplacian filter and then added up to make the sharpening term. The final result is the smoothing term plus some fraction of the sharpening term.

Turning now to image 2220 of FIG. 22C, after accomplishing the smoothing at the smallest scale, in a second pass, the distance along the edge may be increased to fetch nine sample point 2225, as shown. These points may be smoothed in the same manner as the closer points, producing an even more refined smoothing result at the pixel. According to some embodiments, each stage only has the smoothing applied if the alignment map is above a threshold for the stage. For the first stage (i.e., at distance 1), the threshold may be set to 0.0. For the second stage (i.e., at distance 2), the threshold may be set to 0.25. For the third stage (i.e., at distance 4), the threshold may be set to 0.5, and for the final stage (i.e., at distance 8), the threshold may be set to 0.75.

As shown in the third stage, i.e., at distance 4 (see image 2230 of FIG. 22D), each stage continues to load pixels that are aligned precisely with the edge. It is for this reason that the edge directions may be computed using a floating point vector field rather than being represented as quantized discrete angles. This is also, in part, because more accuracy may be required at each level.

The final stage in this embodiment is at distance 8 (see image 2240 of FIG. 22E). It has been empirically determined that the noisiest images require an exceptional amount of smoothing, but also that a very straight line could be smoothed more than lines that have curvature. This is especially true at corners. In the alignment map, the corners are local minima, and this serves to prevent them from being smoothed too much. In other words, corners are not rounded off using this technique. This helps to preserve small text and other details in the image.

Figure 23:
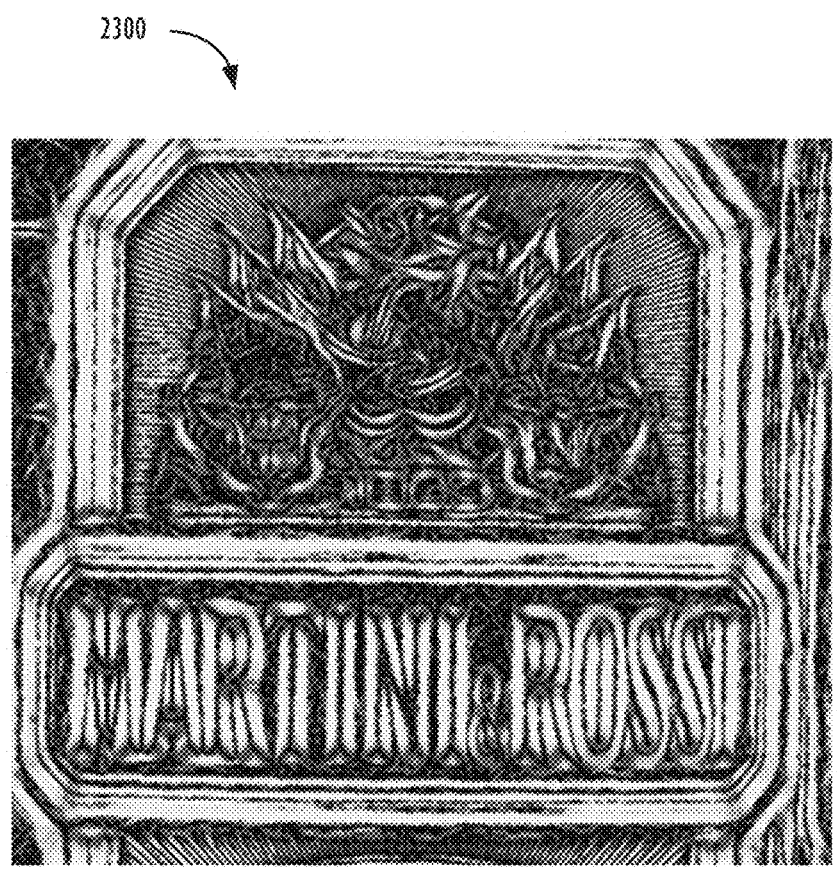
FIG. 23 is an example heat map for an exemplary image.

As shown in the alignment heat map of image 2300 in FIG. 23, the coolest areas in the image are near the corners of the letters of the MARTINI & ROSSI® text ("MARTINI & ROSSI" is a registered trademark of MARTINI & ROSSI CORPORATION). Also, the radial lines are hottest near the centers and cool near their edges. This prevents the ends of these lines from being shortened and smoothed away. Thus, lines that are straight and long get smoothed the most. As noted previously, this algorithm is also highly amenable to GPU implementation.

Figure 24B:
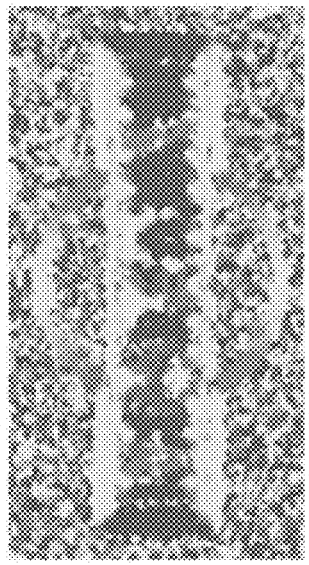
FIG. 24B is a normalized unit-length edge direction map for the exemplary image of FIG. 24A.
Figure 24D:
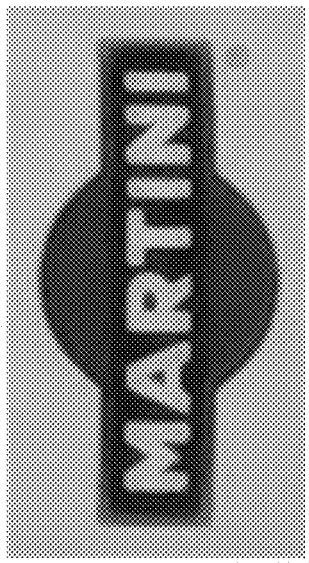
FIG. 24D is a smoothed result from denoising the exemplary image of FIG. 24A.
Figure 24A:
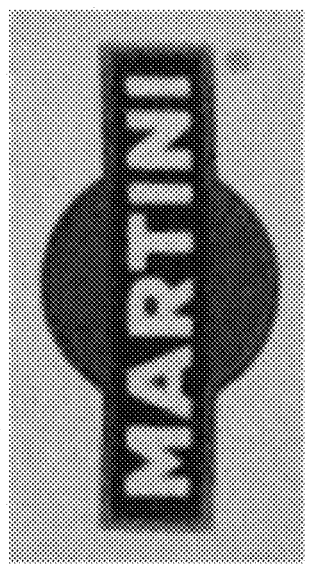
FIG. 24A is an exemplary image with noise.
Figure 24C:
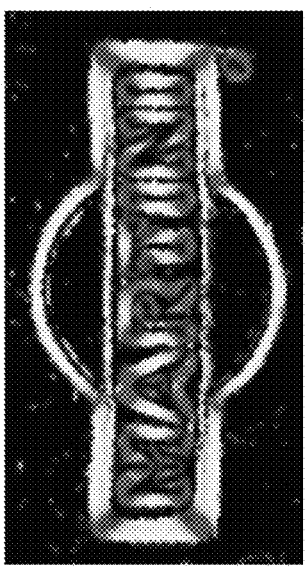
FIG. 24C is an extracted edge alignment data map for the exemplary image of FIG. 24A.

In the example of FIGS. 24A-24D, an exemplary image 2400 (see FIG. 24A) with noise is analyzed. First, the edge direction vector field may be computed. Image 2410 of FIG. 24B shows the normalized unit-length edge direction wrapped onto an 180-degree domain and depicted in hue so horizontal lines look yellow and vertical lines look blue. Next, the extracted edge alignment data is shown as a heat map (see, e.g., image 2420 of FIG. 24C). Finally, the smoothed result is shown (see, e.g., image 2430 of FIG. 24D). Note that corners have been preserved, the noisy areas appear flat, and edges are smooth.

One embodiment of the actual smoothing process is shown in the pseudocode below:

```
float smooth(image detail, vectorfield v, image map, point p, float scale,
    float thresh, float amt, float samt)
{
    float alignment, s1, s2, s3, s4, s5, s6, s7, s8, s9, c1, c2, c3, hf, sign,
        result;
    vector along, perp;
    along = v[p];
    perp = vector(along.y, -along.x);
    along *= scale;
    s1 = detail[p-perp-along]; s2 = detail[p-perp]; s3 =
        detail[p-perp+along];
    s4 = detail[p-along]; s5 = detail[p]; s6 = detail[p+along];
    s7 = detail[p+perp-along]; s8 = detail[p+perp]; s9 =
        detail[p+perp+along];
    c1 = 0.25*s1 + 0.5*s2 + 0.25*s3;
    c2 = 0.25*s4 + 0.5*s5 + 0.25*s6;
    c3 = 0.25*s7 + 0.5*s8 + 0.25*s9;
    hf = -0.25*c1 + 0.5*c2 - 0.25*c3;
    sign = sgn(hf);
    hf = min(abs(hf), 0.005) * sign;
    c2 += hf * samt;
    result = s5 + (c2 - s5) * amt;
    if (map[p] < thresh)
        result = s5;
    return result;
}
```

As shown in the pseudocode above, at the pixel (p), the process may load the normalized (i.e., unit-length) direction (i.e., the 'along' variable in the pseudocode directly above) aligned with the edge from the edge direction vector field (i.e., the 'v' variable in the pseudocode directly above). Then, the process may compute the perpendicular unit-length vector (perp). The current scale (e.g., 1, 2, 4, or 8) may then be used to magnify the along vector.

Then, the process may load the nine points aligned with the edge, and one pixel to left and to right. This corresponds to the diagrams shown in FIGS. 22A-22E. Weighted column averages (c1, c2, and c3) are then computed using small one-dimensional Gaussians. The center term (c2) represents a natural smoothing along the edge at the pixel. Then, a high-frequency term (hf) gets computed, using a one-dimensional Laplacian. The high frequency term may be limited to a small amount, effectively preventing ringing from being produced when the image is sharpened. Then, some of the sharpening term (hf) may be added to the smoothed result (c2) using the sharpening amount (samt). Next, the result is computed by interpolating from the unsmoothed value at the pixel (s5) towards the smoothed result (c2). Finally, it is determined whether the alignment map (map) is above the chosen threshold for the level (thresh) and only smoothed if that is, in fact, the case. This may be done by reverting to the unsmoothed result (s5) when the alignment map does not exceed the threshold (thresh).

FIGS. 25A-25D show an in-depth smoothing example, beginning with an unsmoothed detail image (image 2500 of FIG. 25A) and the alignment heat map (image 2510 of FIG. 25B), as produced from the original luminance image. The unsmoothed detail image 2500 exhibits noise that is particularly visible in flat areas, as well as in the roughness of all the straight lines. The alignment heat map 2510 shows brightest areas where the lines are long and straight.

Next, the smoothed detail image (image 2520 of FIG. 25C) shows that most of the smoothing was performed on the long straight lines, and that none of the corners were rounded off. The flat areas are also smoothed a little, causing the noise to become a bit 'swimmy'. The feature map (image 2530 of FIG. 25D) is also shown, indicating areas (in white) where the smoothed detail is preserved. In black areas, the half-size image (suitably up-sampled and spatial-frequencylimited) gets rendered. This eliminates the swimmy noise areas and replaces then with smooth, flat tone. Thus, this example describes how edges are smoothed and how the up-sampled half-size data is used to smooth the non-edge areas.

Figure 26:
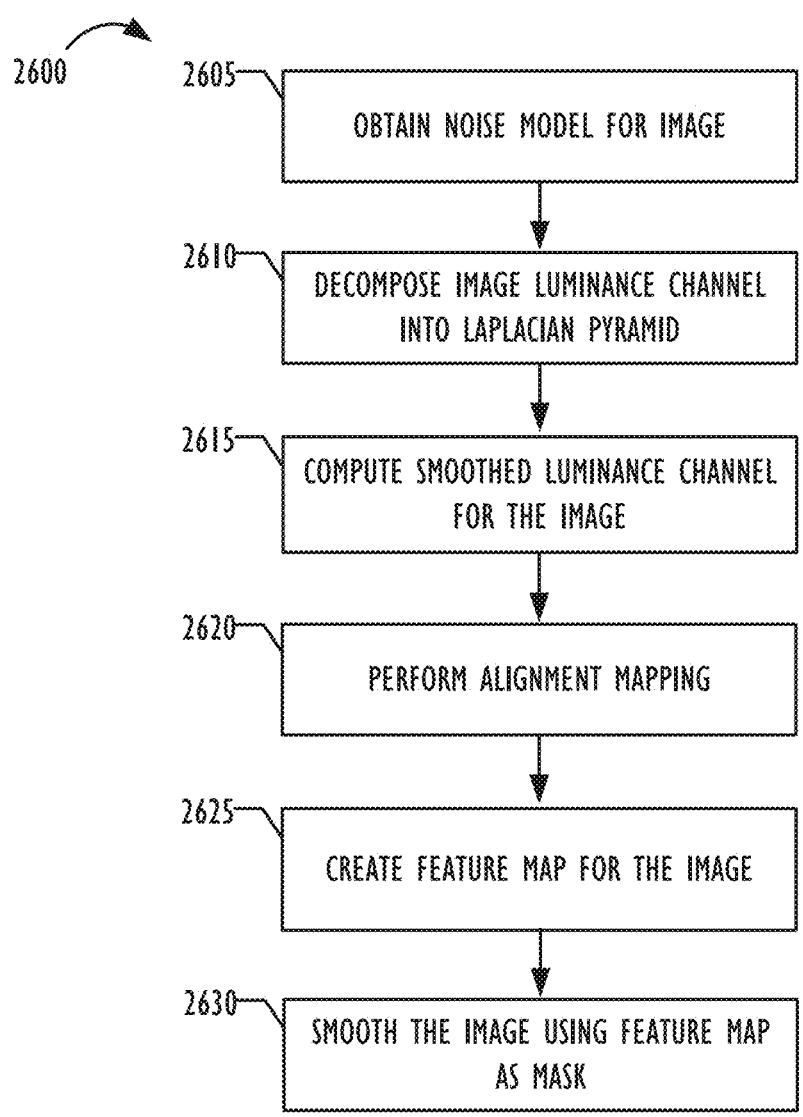
FIG. 26 is a flowchart of an exemplary process for performing improved raw camera noise reduction, in accordance with one embodiment.

Referring now to FIG. 26, a method 2600 for performing raw camera noise reduction is illustrated at a high-level, in flowchart form. First, the process begins by obtaining a noise model for the image to be noise reduced (Step 2605). Next, the process decomposes the image's luminance (Y) channel, e.g., using a Laplacian pyramid technique (Step 2610). Next, the process computes a smoothed luminance channel for the image (Step 2615). Next, the process performs a novel "alignment mapping" technique, as is described in detail above (Step 2620). Next, the process creates a feature map over the image (Step 2625). Finally, the feature map may be used as a mask in a process to smooth over the entire denoised image (Step 2630).

Figure 27:
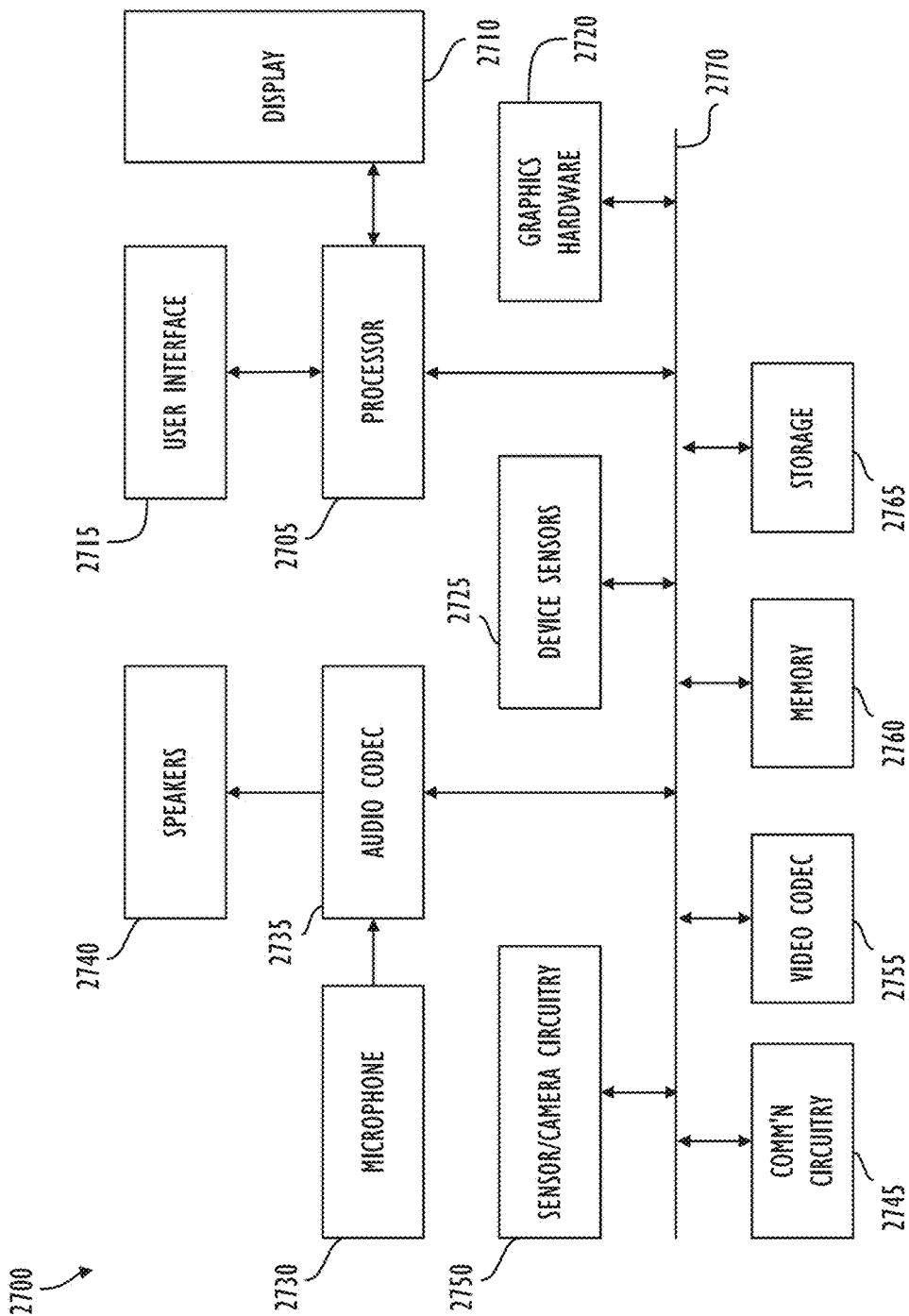
FIG. 27 is a block diagram of an illustrative electronic device, in accordance with one embodiment.

Referring now to FIG. 27, a simplified functional block diagram of illustrative electronic device 2700 is shown according to one embodiment. Electronic device 2700 may include processor 2705, display 2710, user interface 2715, graphics hardware 2720, device sensors 2725 (e.g., proximity sensor/ambient light sensor, accelerometer and/or gyroscope), microphone 2730, audio codec(s) 2735, speaker(s) 2740, communications circuitry 2745, digital image capture unit 2750, video codec(s) 2755, memory 2760, storage 2765, and communications bus 2770. Electronic device 2700 may be, for example, a personal digital assistant (PDA), personal music player, mobile telephone, notebook, laptop or tablet computer, desktop computer, or server computer. More particularly, the operations described above may be performed on a device that takes the form of device 2700.

Processor 2705 may execute instructions necessary to carry out or control the operation of many functions performed by device 2700. Processor 2705 may, for instance, drive display 2710 and receive user input from user interface 2715. User interface 2715 can take a variety of forms, such as a button, keypad, dial, a click wheel, keyboard, display screen and/or a touch screen. Processor 2705 may also, for example, be a system-on-chip such as those found in mobile devices and include a dedicated graphics processing unit (GPU). Processor 2705 may be based on reduced instruction-set computer (RISC) or complex instruction-set computer (CISC) architectures or any other suitable architecture and may include one or more processing cores. Graphics hardware 2720 may be special purpose computational hardware for processing graphics and/or assisting processor 2705 to process graphics information. In one embodiment, graphics hardware 2720 may include a programmable graphics processing unit (GPU).

Sensor and camera circuitry 2750 may capture still and video images that may be processed, at least in part, by video codec(s) 2755 and/or processor 2705 and/or graphics hardware 2720, and/or a dedicated image processing unit incorporated within circuitry 2750. Images so captured may be stored in memory 2760 and/or storage 2765. Memory 2760 may include one or more different types of media used by processor 2705 and graphics hardware 2720 to perform device functions. For example, memory 2760 may include memory cache, read-only memory (ROM), and/or random access memory (RAM). Storage 2765 may store media (e.g., audio, image and video files), computer program instructions or software, preference information, device profile information, and any other suitable data. Storage 2765 may include one or more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 2760 and storage 2765 may be used to tangibly retain computer program instructions or code organized into one or more modules and written in any desired computer programming language. When executed by, for example, processor 2705 such computer program code may implement one or more of the methods described herein.

It is to be understood that the above description is intended to be illustrative, and not restrictive. The material has been presented to enable any person skilled in the art to make and use the inventive concepts described herein, and is provided in the context of particular embodiments, variations of which will be readily apparent to those skilled in the art (e.g., some of the disclosed embodiments may be used in combination with each other). Many other embodiments will be apparent to those of skill in the art upon reviewing the above description. The scope of the invention therefore should be determined with reference to the appended claims, along with the full scope of equivalents to which such claims are entitled.

The invention claimed is:

1. A non-transitory program storage device, readable by a processor and comprising instructions stored thereon to cause the processor to:
    obtain, with a processor, image data representative of a first image, the image data comprising a first plurality of pixels, each pixel comprising a luminance value and a second plurality of pixel color values;
    obtain, with the processor, a noise model for the first image;
    decompose the luminance values of the first plurality of pixels;
    smooth the luminance values of the first plurality of pixels based, at least in part, on the decomposed luminance values;
    create an alignment map for the first plurality of pixels based, at least in part, on the obtained noise model and the smoothed luminance values of the first plurality of pixels;
    store the alignment map in the memory;
    create a feature map for the first plurality of pixels based, at least in part, on the obtained noise model and the smoothed luminance values of the first plurality of pixels;
    store the feature map in the memory;
    smooth the first plurality of pixels based, at least in part, on the alignment map and the feature map; and
    store the smoothed first plurality of pixels as a first denoised image in the memory.

2. The non-transitory program storage device of claim 1, wherein the instructions to decompose the luminance values further comprise instructions to decompose the luminance values using a Laplacian pyramid.

3. The non-transitory program storage device of claim 1, wherein the instructions to smooth the luminance values further comprise instructions to compute an edge direction vector field or a gradient magnitude map for the first plurality of pixels.

4. The non-transitory program storage device of claim 1, wherein the instructions to smooth the luminance values further comprise instructions to compute a Gabor convolution or one or more Gabor filters.

5. The non-transitory program storage device of claim 1, wherein the alignment map comprises an indication of a structure of the first image by measuring an alignment of one or more vectors along a first edge in the first image.

6. The non-transitory program storage device of claim 1, wherein the alignment map comprises an indication of a length or a straightness of one or more edges in the first image.

7. The non-transitory program storage device of claim 1, wherein the program instructions further comprise program instructions to compute one or more thresholds or scaling parameters for either the alignment map, an edge direction vector field, or the feature map based, at least in part, on the noise model.

8. A computer-implemented method of reducing noise in images, comprising:
- obtaining, with a processor, image data representative of a first image, the image data comprising a first plurality of pixels, each pixel comprising a luminance value and a second plurality of pixel color values;
- obtaining, with the processor, a noise model for the first image;
- decomposing the luminance values of the first plurality of pixels;
- smoothing the luminance values of the first plurality of pixels based, at least in part, on the decomposed luminance values;
- creating an alignment map for the first plurality of pixels based, at least in part, on the obtained noise model and the smoothed luminance values of the first plurality of pixels;
- storing the alignment map in the memory;
- creating a feature map for the first plurality of pixels based, at least in part, on the obtained noise model and the smoothed luminance values of the first plurality of pixels;
- storing the feature map in the memory;
- smoothing, with the processor, the first plurality of pixels based, at least in part, on the alignment map and the feature map; and
- storing the smoothed first plurality of pixels as a first denoised image in the memory.

9. The method of claim 8, wherein decomposing the luminance values further comprises decomposing the luminance values using a Laplacian pyramid.

10. The method of claim 8, wherein smoothing the luminance values further comprises computing an edge direction vector field or a gradient magnitude map for the first plurality of pixels.

11. The method of claim 8, wherein smoothing the luminance values further comprises computing a Gabor convolution or one or more Gabor filters.

12. The method of claim 8, wherein the alignment map comprises an indication of a structure of the first image by measuring an alignment of one or more vectors along a first edge in the first image.

13. The method of claim 8, further comprising computing one or more thresholds or scaling parameters for either the alignment map, an edge direction vector field, or the feature map based, at least in part, on the noise model.

14. A device, comprising:
- a memory;
- a display; and
- one or more processors operatively coupled to the memory and the display and configured to execute program instructions stored in the memory to:
  - obtain, from the memory, image data representative of a first image, the image data comprising a first plurality of pixels, each pixel comprising a luminance value and a second plurality of pixel color values;
  - obtain, from the memory, a noise model for the first image;
  - decompose the luminance values of the first plurality of pixels;
  - smooth the luminance values of the first plurality of pixels based, at least in part, on the decomposed luminance values;
  - create an alignment map for the first plurality of pixels based, at least in part, on the obtained noise model and the smoothed luminance values of the first plurality of pixels;
  - store the alignment map in the memory;
  - create a feature map for the first plurality of pixels based, at least in part, on the obtained noise model and the smoothed luminance values of the first plurality of pixels;
  - store the feature map in the memory;
  - smooth the first plurality of pixels based, at least in part, on the alignment map and the feature map; and
  - store the smoothed first plurality of pixels as a first denoised image in the memory.

15. The device of claim 14, wherein the instructions to decompose the luminance values further comprise instructions to decompose the luminance values using a Laplacian pyramid.

16. The device of claim 14, wherein the instructions to smooth the luminance values further comprise instructions to compute an edge direction vector field or a gradient magnitude map for the first plurality of pixels.

17. The device of claim 14, wherein the instructions to smooth the luminance values further comprise instructions to compute a Gabor convolution or one or more Gabor filters.

18. The device of claim 14, wherein the alignment map comprises an indication of a structure of the first image by measuring an alignment of one or more vectors along a first edge in the first image.

19. The device of claim 14, wherein the alignment map comprises an indication of a length or a straightness of one or more edges in the first image.

20. The device of claim 14, wherein the program instructions further comprise program instructions to compute one or more thresholds or scaling parameters for either the alignment map, an edge direction vector field, or the feature map based, at least in part, on the noise model.

* * * * *